US009860265B2

(12) United States Patent
Gula et al.

(10) Patent No.: US 9,860,265 B2
(45) Date of Patent: *Jan. 2, 2018

(54) SYSTEM AND METHOD FOR IDENTIFYING EXPLOITABLE WEAK POINTS IN A NETWORK

(71) Applicant: Tenable Network Security, Inc., Columbia, MD (US)

(72) Inventors: Ron Gula, Marriottsville, MD (US); Renaud Deraison, New York, NY (US)

(73) Assignee: Tenable Network Security, Inc., Columbia, MD (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/689,762

(22) Filed: Apr. 17, 2015

(65) Prior Publication Data
US 2015/0222655 A1 Aug. 6, 2015

Related U.S. Application Data

(63) Continuation of application No. 13/653,834, filed on Oct. 17, 2012, now Pat. No. 9,043,920.
(Continued)

(51) Int. Cl.
*H04L 29/06* (2006.01)
*H04L 29/08* (2006.01)
*H04L 12/24* (2006.01)

(52) U.S. Cl.
CPC .......... *H04L 63/1433* (2013.01); *H04L 67/10* (2013.01); *H04L 41/12* (2013.01)

(58) Field of Classification Search
CPC ..... G06F 21/577; G06F 21/57; H04L 63/1433
See application file for complete search history.

(56) References Cited

U.S. PATENT DOCUMENTS 4,525,599 A 6/1985 Curran et al.
5,541,997 A 7/1996 Pappas et al.
(Continued)

OTHER PUBLICATIONS

"Vulnerability Summary for CVE-2008-2244", published by the National Vulnerability Database, retrieved from <http://web.archive.org/web/20100601174107/http://web.nvd.nist.gov/view/vuln/detail?vulnId=CVE-2008-2244>, retrieved on Jul. 7, 2016.*
(Continued)

*Primary Examiner* — Jeffery Williams
(74) *Attorney, Agent, or Firm* — S. Jafar Ali; Muncy, Geissler, Olds & Lowe, P.C.

(57) ABSTRACT

The system and method described herein may leverage passive and active vulnerability discovery to identify network addresses and open ports associated with connections that one or more passive scanners observed in a network and current connections that one or more active scanners enumerated in the network. The observed and enumerated current connections may be used to model trust relationships and identify exploitable weak points in the network, wherein the exploitable weak points may include hosts that have exploitable services, exploitable client software, and/or exploitable trust relationships. Furthermore, an attack that uses the modeled trust relationships to target the exploitable weak points on a selected host in the network may be simulated to enumerate remote network addresses that could compromise the network and determine an exploitation path that the enumerated remote network addresses could use to compromise the network.

35 Claims, 7 Drawing Sheets

Related U.S. Application Data

(60) Provisional application No. 61/665,107, filed on Jun. 27, 2012.

(56) References Cited

U.S. PATENT DOCUMENTS

| | | | |
|---|---|---|---|
| 5,572,729 | A | 11/1996 | Giordano et al. |
| 5,715,391 | A | 2/1998 | Jackson et al. |
| 5,721,819 | A | 2/1998 | Galles et al. |
| 5,838,919 | A | 11/1998 | Schwaller et al. |
| 5,844,817 | A | 12/1998 | Lobley et al. |
| 6,154,775 | A | 11/2000 | Coss et al. |
| 6,266,774 | B1 | 7/2001 | Sampath et al. |
| 6,324,656 | B1 | 11/2001 | Gleichauf et al. |
| 6,393,568 | B1 | 5/2002 | Ranger et al. |
| 6,415,321 | B1 | 7/2002 | Gleichauf et al. |
| 6,487,666 | B1 | 11/2002 | Shanklin et al. |
| 6,499,107 | B1 | 12/2002 | Gleichauf et al. |
| 6,510,509 | B1 | 1/2003 | Chopra et al. |
| 6,606,663 | B1 | 8/2003 | Liao et al. |
| 6,704,874 | B1 | 3/2004 | Porras et al. |
| 6,711,127 | B1 | 3/2004 | Gorman et al. |
| 6,789,202 | B1 | 9/2004 | Ko et al. |
| 6,847,982 | B2 | 1/2005 | Parker et al. |
| 6,873,617 | B1 | 3/2005 | Karras |
| 6,882,728 | B1 | 4/2005 | Takahashi et al. |
| 6,886,020 | B1 | 4/2005 | Zahavi et al. |
| 6,952,779 | B1 | 10/2005 | Cohen et al. |
| 6,957,348 | B1 | 10/2005 | Flowers et al. |
| 6,968,377 | B1 | 11/2005 | Gleichauf et al. |
| 7,013,395 | B1 | 3/2006 | Swiler et al. |
| 7,017,186 | B2 | 3/2006 | Day |
| 7,073,198 | B1 | 7/2006 | Flowers et al. |
| 7,093,287 | B1 | 8/2006 | Gusler et al. |
| 7,120,148 | B1 | 10/2006 | Batz et al. |
| 7,134,141 | B2 | 11/2006 | Crosbie et al. |
| 7,139,819 | B1 | 11/2006 | Luo et al. |
| 7,162,742 | B1 | 1/2007 | Flowers et al. |
| 7,181,769 | B1 | 2/2007 | Keanini et al. |
| 7,237,264 | B1 | 6/2007 | Graham et al. |
| 7,243,366 | B2 | 7/2007 | Medvinsky et al. |
| 7,272,646 | B2 | 9/2007 | Cooper et al. |
| 7,290,145 | B2 | 10/2007 | Falkenthros |
| 7,310,687 | B2 | 12/2007 | Psounis et al. |
| 7,324,551 | B1 | 1/2008 | Stammers |
| 7,451,488 | B2 * | 11/2008 | Cooper ............... H04L 63/102 726/2 |
| 7,483,986 | B2 | 1/2009 | Hanson et al. |
| 7,509,681 | B2 | 3/2009 | Flowers et al. |
| 7,530,104 | B1 | 5/2009 | Thrower et al. |
| 7,562,388 | B2 | 7/2009 | Hackenberger et al. |
| 7,571,482 | B2 | 8/2009 | Polyakov et al. |
| 7,594,273 | B2 | 9/2009 | Keanini et al. |
| 7,603,711 | B2 | 10/2009 | Scheidell |
| 7,653,647 | B2 | 1/2010 | Borthakur et al. |
| 7,661,134 | B2 | 2/2010 | Radatti |
| 7,735,100 | B1 | 6/2010 | Sallam |
| 7,735,140 | B2 | 6/2010 | Datla et al. |
| 7,739,377 | B2 | 6/2010 | Benedetti et al. |
| 7,752,671 | B2 | 7/2010 | Kotler et al. |
| 7,761,918 | B2 | 7/2010 | Gula et al. |
| 7,774,848 | B2 | 8/2010 | D'Mello et al. |
| 7,882,542 | B2 | 2/2011 | Neystadt et al. |
| 7,895,651 | B2 | 2/2011 | Brennan |
| 7,904,479 | B2 | 3/2011 | Zuk |
| 7,904,962 | B1 | 3/2011 | Jajodia et al. |
| 7,908,254 | B2 | 3/2011 | Suermondt et al. |
| 7,926,113 | B1 | 4/2011 | Gula et al. |
| 7,966,358 | B2 | 6/2011 | Deolalikar et al. |
| 7,971,252 | B2 | 6/2011 | Lippmann et al. |
| 7,975,298 | B1 | 7/2011 | Venkatasubrahmanyam |
| 7,996,836 | B1 | 8/2011 | McCorkendale et al. |
| 8,001,606 | B1 | 8/2011 | Spertus |
| 8,015,284 | B1 | 9/2011 | Isenberg et al. |
| 8,032,489 | B2 | 10/2011 | Villella et al. |
| 8,126,853 | B2 | 2/2012 | Sakamoto |
| 8,135,815 | B2 | 3/2012 | Mayer |
| 8,135,823 | B2 | 3/2012 | Cole et al. |
| 8,191,149 | B2 | 5/2012 | Yun et al. |
| 8,201,257 | B1 | 6/2012 | Andres et al. |
| 8,239,942 | B2 | 8/2012 | Shanklin et al. |
| 8,601,587 | B1 * | 12/2013 | Powell ............... G06F 21/552 726/25 |
| 2001/0034847 | A1 | 10/2001 | Gaul, Jr. |
| 2002/0019945 | A1 | 2/2002 | Houston et al. |
| 2002/0093527 | A1 | 7/2002 | Sherlock et al. |
| 2002/0100023 | A1 | 7/2002 | Ueki et al. |
| 2002/0107841 | A1 | 8/2002 | Hellerstein et al. |
| 2002/0138762 | A1 | 9/2002 | Horne |
| 2002/0166063 | A1 | 11/2002 | Lachman, III et al. |
| 2002/0199116 | A1 | 12/2002 | Hoene et al. |
| 2003/0051026 | A1 | 3/2003 | Carter et al. |
| 2003/0056116 | A1 | 3/2003 | Bunker, V et al. |
| 2003/0135517 | A1 | 7/2003 | Kauffman |
| 2003/0145225 | A1 | 7/2003 | Bruton, III et al. |
| 2003/0196123 | A1 | 10/2003 | Rowland et al. |
| 2003/0212779 | A1 | 11/2003 | Boyter et al. |
| 2003/0220940 | A1 | 11/2003 | Futoransky et al. |
| 2004/0003266 | A1 | 1/2004 | Moshir et al. |
| 2004/0015719 | A1 | 1/2004 | Lee et al. |
| 2004/0042470 | A1 | 3/2004 | Cooper et al. |
| 2004/0093521 | A1 | 5/2004 | Hamadeh et al. |
| 2004/0193918 | A1 | 9/2004 | Green et al. |
| 2004/0250169 | A1 | 12/2004 | Takemori et al. |
| 2005/0044390 | A1 | 2/2005 | Trostle |
| 2005/0068928 | A1 | 3/2005 | Smith et al. |
| 2005/0097199 | A1 | 5/2005 | Woodard et al. |
| 2005/0108578 | A1 | 5/2005 | Tajalli et al. |
| 2005/0128988 | A1 | 6/2005 | Simpson et al. |
| 2005/0188419 | A1 | 8/2005 | Dadhia et al. |
| 2005/0193430 | A1 * | 9/2005 | Cohen ............... H04L 63/1433 726/25 |
| 2005/0203886 | A1 | 9/2005 | Wong |
| 2005/0203921 | A1 | 9/2005 | Newman et al. |
| 2005/0229255 | A1 | 10/2005 | Gula et al. |
| 2006/0010245 | A1 | 1/2006 | Carnahan |
| 2006/0018466 | A1 | 1/2006 | Adelstein et al. |
| 2006/0031476 | A1 | 2/2006 | Mathes et al. |
| 2006/0075089 | A1 * | 4/2006 | Alam ..................... H04L 67/22 709/224 |
| 2006/0117091 | A1 | 6/2006 | Justin |
| 2006/0130144 | A1 | 6/2006 | Wernicke |
| 2006/0161816 | A1 | 7/2006 | Gula et al. |
| 2006/0184682 | A1 | 8/2006 | Suchowski et al. |
| 2006/0212569 | A1 * | 9/2006 | Ammerman ........... H04L 67/16 709/224 |
| 2007/0028110 | A1 | 2/2007 | Brennan |
| 2007/0028302 | A1 | 2/2007 | Brennan et al. |
| 2007/0028304 | A1 | 2/2007 | Brennan |
| 2007/0067848 | A1 * | 3/2007 | Gustave ............. H04L 63/1433 726/25 |
| 2007/0169190 | A1 | 7/2007 | Kolton et al. |
| 2007/0240220 | A1 | 10/2007 | Tuvell et al. |
| 2007/0271598 | A1 | 11/2007 | Chen et al. |
| 2007/0277238 | A1 | 11/2007 | Margalit et al. |
| 2008/0002725 | A1 | 1/2008 | Alicherry et al. |
| 2008/0022400 | A1 | 1/2008 | Cohen et al. |
| 2008/0046393 | A1 | 2/2008 | Jajodia et al. |
| 2008/0047009 | A1 | 2/2008 | Overcash et al. |
| 2008/0072285 | A1 | 3/2008 | Sankaran et al. |
| 2008/0155084 | A1 | 6/2008 | Yu et al. |
| 2009/0013141 | A1 | 1/2009 | Kinoshita |
| 2009/0044024 | A1 | 2/2009 | Oberheide et al. |
| 2009/0049016 | A1 | 2/2009 | Sakamoto |
| 2009/0077666 | A1 | 3/2009 | Chen et al. |
| 2009/0177782 | A1 | 7/2009 | Blatherwick et al. |
| 2010/0030780 | A1 | 2/2010 | Eshghi et al. |
| 2010/0043066 | A1 | 2/2010 | Miliefsky |
| 2010/0058431 | A1 | 3/2010 | McCorkendale et al. |
| 2010/0058456 | A1 | 3/2010 | Jajodia et al. |
| 2010/0077444 | A1 * | 3/2010 | Forristal ............... G06F 21/577 726/1 |
| 2010/0077479 | A1 | 3/2010 | Viljoen |
| 2010/0083381 | A1 | 4/2010 | Khosravi et al. |

(56) References Cited

U.S. PATENT DOCUMENTS

| | | |
|---|---|---|
| 2010/0114842 A1 | 5/2010 | Forman et al. |
| 2010/0138925 A1 | 6/2010 | Barai et al. |
| 2010/0169975 A1 | 7/2010 | Stefanidakis et al. |
| 2010/0174921 A1 | 7/2010 | Abzarian et al. |
| 2010/0175106 A1 | 7/2010 | Diebler et al. |
| 2010/0175134 A1 | 7/2010 | Ali-Ahmad et al. |
| 2010/0175135 A1 | 7/2010 | Kandek et al. |
| 2010/0262688 A1 | 10/2010 | Hussain et al. |
| 2010/0281539 A1 | 11/2010 | Burns et al. |
| 2010/0281543 A1 | 11/2010 | Golomb et al. |
| 2010/0332593 A1 | 12/2010 | Barash et al. |
| 2011/0029772 A1 | 2/2011 | Fanton et al. |
| 2011/0047597 A1 | 2/2011 | Mahaffey et al. |
| 2011/0061104 A1 | 3/2011 | Sarraute Yamada et al. |
| 2011/0099620 A1 | 4/2011 | Stavrou et al. |
| 2011/0126287 A1 | 5/2011 | Yoo |
| 2011/0162070 A1 | 6/2011 | Krasser et al. |
| 2011/0185055 A1 | 7/2011 | Nappier et al. |
| 2011/0185431 A1 | 7/2011 | Deraison |
| 2011/0191854 A1 | 8/2011 | Giakouminakis et al. |
| 2011/0231934 A1 | 9/2011 | Davis et al. |
| 2011/0231935 A1 | 9/2011 | Gula et al. |
| 2011/0277034 A1 | 11/2011 | Hanson |
| 2011/0314245 A1 | 12/2011 | Hanes et al. |
| 2012/0011590 A1 | 1/2012 | Donovan |
| 2012/0158725 A1 | 6/2012 | Molloy et al. |
| 2012/0233700 A1 | 9/2012 | Ali-Ahmad et al. |
| 2012/0304300 A1* | 11/2012 | LaBumbard .......... G06F 21/577 726/25 |
| 2015/0304351 A1* | 10/2015 | Oberheide ............ H04W 12/12 726/25 |

OTHER PUBLICATIONS

Cynthia Phillips and Laura Painton Swiler. 1998. A graph-based system for network-vulnerability analysis. In Proceedings of the 1998 workshop on New security paradigms (NSPW '98). ACM, New York, NY, USA, 71-79.*

Ryan Trost, "Proactive Intrusion Prevention and Response via Attack Graphs", Jul. 27, 2009, Addison-Wesley Professional, "Practical Intrusion Analysis: Prevention and Detection for the Twenty-First Century: Prevention and Detection for the Twenty-First Century".*

Wack, John et al., NIST Special Publication 800-42, "Guideline on Network Security Testing", Computer Security Division National Institute of Standards and Technology, Oct. 2003, pp. 1-92.

Deraison, Ranaud et al., "Passive Vulnerability Scanning Introduction to NeVo", Revision 9, Tenable Network Security, Aug. 2003, pp. 1-13.

Deraison, Renaud et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin et al., "Detecting Backdoors", Proceedings of the 9th ISENIX Security Symposium, Denver, Colorado, Aug. 2000, 11 pages.

"Basic Cryptanalysis", Department of the Arm, Field Manual No. 34-40-2, Sep. 13, 1990, 363 pages.

Kim, Gene et al., "The Design and Implementation of Tripwire: A File System Integrity Checker", Proceedings of the 2nd ACM Conference on Computer and Communications Security, 1994, (Purdue Technical Report CSD-TR-93-071), 18 pages.

Oline, Adam et al., "Exploring Three-Dimensional Visualization for Intrusion Detection", Workshop on Visualization for Computer Security, IEEE, Oct. 26, 2005, 9 pages.

Gula, Ron, "Predicting Attack Paths: Leveraging active and passive vulnerability discovery to identify trusted exploitable weak points in your network", Tenable Network Security, Inc., Mar. 20, 2012, Revision 2.

Hoagland, James A., "Audit Log Analysis Using the Visual Audit Browser Toolkit", Department of Computer Science, University of California, Davis.

Tenable Network Security, "Log Correlation Engine Best Practices", Mar. 2, 2012, Revision 2.

Tenable Network Security, "Log Correlation Engine 4.0 High Performance Configuration Guide", Jul. 10, 2012, Revision 2.

Gula, Ron, "Tenable Event Correlation", Tenable Network Security, Mar. 1, 2012, Revision 1.

FortiAnalyzer TM, Administration Guide, Version 4.0 MR2, Mar. 21, 2011, Revision 13.

Tenable Network Security, Inc., Strategic Anti-Malware Monitoring with Nessus, PVS, & LCE, May 29, 2012, Revision 1, 1-11, Tenable Network Security, Inc., Columbia, MD.

Tenable Network Security, Inc., Log Correlation Engine Asset & Vulnerability Discovery, 2012, 1-5, Tenable Network Security, Inc., Columbia, MD.

Tenable Network Security, Inc., "Log Correlation Engine 4.0 Administration and User Guide", Mar. 5, 2013, 1-56, Tenable Network Security, Inc., Columbia, MD.

Asadoorian, Paul, Detecting Known Malware Processes Using Nessus.

* cited by examiner

SYSTEM AND METHOD FOR IDENTIFYING EXPLOITABLE WEAK POINTS IN A NETWORK

CROSS-REFERENCE TO RELATED APPLICATIONS

The present application is a continuation of U.S. patent application Ser. No. 13/653,834, entitled "System and Method for Identifying Exploitable Weak Points in a Network," filed Oct. 17, 2012, which claims benefit to U.S. Provisional Patent Application Ser. No. 61/665,107, entitled "System and Method for Identifying Exploitable Weak Points in a Network," filed Jun. 27, 2012, the contents of which are each hereby incorporated by reference in their entirety.

FIELD OF THE INVENTION

The invention generally relates to a system and method for identifying exploitable weak points in a network, and in particular, to leveraging active and passive vulnerability discovery to identify remotely visible and exploitable services, client software, and trust relationships and simulate hacking via server-side exploits to enumerate remote network addresses that could potentially exploit the identified weak points in the network.

BACKGROUND OF THE INVENTION

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, conventional network scanners (or "active vulnerability scanners") typically send packets or other messages to various devices in the network and then audit the network with information contained in any response packets or messages received from the devices in the network. Accordingly, physical limitations associated with the network typically limit the effectiveness for active vulnerability scanners because only devices that can communicate with the active vulnerability scanners can be audited, while actively scanning networks distributed over large areas or having large numbers of devices may take long amounts of time. For example, in a network that includes multiple routers, hosts, and other network devices, an active vulnerability scanner would typically have to send packets that traverse several routers to scan the hosts and other network devices, some of which may be inactive and therefore inaccessible to the active vulnerability scanner. Further, in scenarios where one or more of the routers have firewalls that screen or otherwise filter incoming and outgoing traffic, the active vulnerability scanner may generate incomplete results because the firewalls may prevent the active vulnerability scanner from auditing hosts or other devices behind the firewalls.

Furthermore, active vulnerability scanners typically create audit results that become stale over time because the audit results describe a static state for the network at a particular point in time. Thus, an active vulnerability scanner would likely fail to detect that hosts have been added or removed from the network following a particular active scan, whereby the audit results that active vulnerability scanners create tend to steadily decrease in value over time as changes to the network occur. Furthermore, active vulnerability scanners can have the tendency to cause network disruptions during an audit. For example, probing network hosts or other devices during an audit performed by an active vulnerability scanner may result in communication bottlenecks, processing overhead, and instability, among other potential problems in the network. Thus, deployment locations, configurations, and other factors employed to manage networks can often interfere with obtaining suitable network auditing results using only active vulnerability scanners.

As such, existing systems that tend to rely entirely on active vulnerability scanners typically prevent the active vulnerability scanner from obtaining comprehensive information that describes important settings, configurations, or other information associated with the network. In particular, malicious or unauthorized users often employ various techniques to obscure network sessions during an attempted breach, but active vulnerability scanners often cannot detect real-time network activity that may provide indications that the attempted breach is occurring. For example, many backdoor and rootkit applications tend to use non-standard ports and custom protocols to obscure network sessions, whereby intruders may compromise the network while escaping detection. Thus, many active vulnerability scanners can only audit the state of a network at a particular point in time, but suitably managing network security often requires further insight relating to real-time activity that occurs in the network. Accordingly, although active vulnerability scanners typically employed in existing network security systems can obtain certain information describing the network, existing systems cannot perform comprehensive security audits to completely describe potential vulnerabilities in the network, build models or topologies for the network, or derive other information that may be relevant to managing the network.

Furthermore, in many instances, certain hosts or devices may participate in sessions occurring on the network, yet the limitations described above can prevent active vulnerability scanners alone from suitably auditing the hosts or devices. As such, various existing network security systems employ one or more passive vulnerability scanners in combination with active vulnerability scanners to analyze traffic traveling across the network, which may supplement the information obtained from the active vulnerability scanners. However, even when employing passive vulnerability scanners in combination with active vulnerability scanners, the amount of data returned by the active vulnerability scanners and the passive vulnerability scanners can often be quite substantial, which can lead to difficulties in administrating the potentially large number of vulnerabilities and assets in the network. For example, many network topologies may include hundreds, thousands, or even larger numbers of nodes, whereby suitably representing the network topologies in a manner that provides visibility into the network can be unwieldy. More particularly, in an ideal world all vulnerabilities identified in a network would be patched in real-time, but most organizations tend to have limited resources and must rely on scheduled patch deployment, which may lead to difficulties in identifying high-value network clients that are subject to network attacks and servers (potentially already fully patched) that are managed with high-risk clients.

However, traditional network modeling solutions tend to suffer from various drawbacks that limit abilities to model network configurations and vulnerabilities. For example, a Windows 2008 system may be fully patched but administered from a desktop that surfs the Internet and that has an unpatched web browser or other exploitable client software, which may raise network vulnerabilities that could escape detection under the techniques employed with existing network security systems. In another example, configurations associated with firewalls, routers, switches, and other traffic management systems may be unavailable or outdated in certain cases, in which case any vulnerability modeling may fail to reflect a current network configuration state. Moreover, many networks have flat configurations in which every system can access every other system from inside a firewall, which raises substantially different issues from a flat network in which only a small subset of systems (e.g., administrators) can access key servers. Further still, current exploit and vulnerability modeling systems tends to be server-centric and therefore only model server exploits and vulnerabilities rather than combinations of client-side and server-side exploits and vulnerabilities.

Accordingly, a need exists for a network security system that can leverage active and passive vulnerability discovery to identify services, client software, trust relationships, and other weak points in a network that may represent remotely and/or internally exploitable vulnerabilities, and a further need exists for a network security system that can simulate attacks paths that may be used to potentially exploit vulnerable services, client software, trust relationships, and other weak points in a network.

SUMMARY OF THE INVENTION

According to one aspect of the invention, the system and method described herein may provide various mechanisms and techniques to leverage active and passive vulnerability discovery to identify remotely visible and exploitable services, client software, trust relationships, and other weak points in a network and simulate hacking via server-side exploits to enumerate remote network addresses that could potentially exploit the identified weak points in the network and determine an exploitation path that the enumerated remote network addresses could potentially use to exploit the identified weak points in the network.

According to one aspect of the invention, the system and method described herein may have one or more passive scanners observe traffic traveling in the network to identify potential vulnerabilities in the network and detect activity that may potentially target or otherwise attempt to exploit vulnerabilities in the network. The passive scanners may generally observe the traffic traveling across the network to reconstruct one or more sessions occurring in the network, which may then be analyzed to identify potential vulnerabilities in the network and/or activity targeting the identified vulnerabilities. As such, the passive scanners may monitor the network in real-time to detect any potential vulnerabilities in the network, identify changes in the network, or otherwise provide visibility into the network and the activity that occurs therein. For example, in one implementation, the passive scanners may be deployed at a network hub, a spanned switch port, a network tap, a network choke point, a dial up node, a server farm, behind a firewall, or any other suitable location that enables the passive scanners to observe incoming and outgoing traffic in the network. In one implementation, the passive scanners may generally be deployed on any suitable server or other host in the network.

According to one aspect of the invention, the system and method described herein may further have one or more active scanners communicate packets or other messages within the network to detect new or changed information describing various routers, hosts, servers, or other devices in the network. For example, in one implementation, the active scanners may perform credentialed audits or uncredentialed scans to scan the hosts, servers, or other devices in the network and obtain information that may then be analyzed to further identify potential vulnerabilities in the network. More particularly, in one implementation, the credentialed audits may include the active scanners using any suitable authentication technology to log into and obtain local access to the hosts, servers, or other devices in the network and perform any suitable operation that local users could perform thereon without necessarily requiring a local agent (although those skilled in the art will appreciate that a local agent may be used in certain implementations). Accordingly, the credentialed audits performed with the active scanners may be used to obtain highly accurate host-based data that includes various client-side issues (e.g., missing patches, operating system settings, locally running services, etc.), while the uncredentialed audits performed therewith may generally include network-based scans that involve communicating packets or messages to the hosts, servers, or other devices in the network and observing responses thereto in order to identify certain network vulnerabilities.

According to one aspect of the invention, the system and method described herein may use information that the passive scanners obtained from observing (or "sniffing") the traffic traversing the network in combination with information that the active scanners obtained in the credentialed audits and/or uncredentialed scans to build a topology or other suitable model describing the network. For example, in one implementation, the model built from the information obtained with the active scanners and the passive scanners may describe any routers, hosts, servers, or other devices detected or actively running in the network, any services or client-side software actively running or supported on the routers, hosts, servers, or other devices, and trust relationships associated with the various routers, hosts, servers, or other devices in the network, among other things. In one implementation, the passive scanners may further apply various signatures to the information in the observed traffic to identify network vulnerabilities, determine whether any data in the observed traffic potentially targets such vulnerabilities, build or update the network model, or otherwise obtain information that may be used to manage the network in response to any new or changed information in the network. Similarly, the active scanners may perform the credentialed audits and/or uncredentialed scans at periodic intervals, at scheduled times, or according to other criteria to further identify the network vulnerabilities, build or update the network model, or otherwise obtain information that may be used to manage the network based on a current state at the time when the active scanners performed the credentialed audits and/or uncredentialed scans.

According to one aspect of the invention, the system and method described herein may further have a management console in communication with the active and passive scanners, wherein the management console may provide a unified security monitoring solution to manage the vulnerabilities and the various routers, hosts, servers, or other devices in the network. In particular, the management console may aggregate the information obtained from the active scanners and the passive scanners to build or update the model associated with the network, which may generally include real-time information describing various vulnerabilities, applied or missing patches, intrusion events, anomalies, event logs, file integrity audits, configuration audits, or any other information that may be relevant to managing the vulnerabilities and assets in the network. As such, the management console may provide a unified interface to mitigate and manage governance, risk, and compliance across the network, and further to leverage the information obtained with the active and passive scanners to identify hosts that have one or more internally and/or remotely exploitable services, hosts that have internally and/or remotely exploitable client software, and hosts that accept trust relationships from other hosts that internally and/or remotely exploitable vulnerabilities. Furthermore, in one implementation, the management console may include various features that may be used to simulate an attack directed at one or more hosts in the network that have internally and/or remotely exploitable vulnerabilities to enumerate remote network addresses that could potentially compromise the network, send malicious data to the network, or otherwise leapfrog into the network via one or more hops.

According to one aspect of the invention, the system and method described herein may further have a log aggregator receive events from various sources distributed across the network, including events generated by internal firewalls, external firewalls, routers, servers, devices, operating systems, applications, or any other suitable network source. In one implementation, the log aggregator may normalize the events contained in various logs received from the sources distributed across the network and aggregate the normalized events with information describing the network snapshot obtained with the active scanners and/or the network traffic observed with the passive scanners. Accordingly, the log aggregator may analyze and correlate events logged in the network with the information describing the observed network traffic and/or the information describing the network snapshot to automatically detect statistical anomalies, correlate the events with the vulnerabilities and assets in the network, search the analyzed and correlated information to identify events meeting certain criteria, or otherwise manage vulnerabilities and assets across the network. Furthermore, in one implementation, the log aggregator may filter the events, the information describing the observed network traffic, and/or the information describing the network snapshot to limit the information that the log aggregator normalizes, analyzes, and correlates to information relevant to a certain security posture. Alternatively (or additionally), the log aggregator may persistently save the events contained in all the logs to comply with regulatory requirements providing that all logs must be stored for a certain period of time. As such, the log aggregator may generally manage the various event logs, network snapshots, and/or observed network activity to comprehensively monitor, remediate, or otherwise manage vulnerabilities and assets in the network.

According to one aspect of the invention, the system and method described herein may therefore have the active scanners generally interrogate any suitable device in the network to obtain information describing a network snapshot at a particular point in time, the passive scanners continuously or periodically observe traffic traveling in the network to identify vulnerabilities, assets, or other information that further describes activity in the network, and the log aggregator collect additional information to further identify the vulnerabilities, assets, or other information describing the network. In one implementation, the management console may therefore collect or otherwise aggregate information obtained with the active scanners, the passive scanners, and the log aggregator and use the collected or aggregated information to generate, update, or otherwise manage models that describe topologies, vulnerabilities, assets, trust relationships, and other information associated with the network. For example, as summarized below and described in greater detail below with reference to the accompanying drawings and the following detailed description, the system and method described herein may use the active scanners, the passive scanners, the log aggregator, the management console, and/or other suitable components to implement various algorithms, techniques, capabilities, or other features that can leverage information discovered or otherwise obtained with the active scanners, the passive scanners, and the log aggregator to identify exploitable services, exploitable client software, exploitable trust relationships, and other weak points in the network and simulate hacking via server-side exploits to enumerate network addresses that could potentially exploit the identified weak points in the network.

According to one aspect of the invention, an exemplary system that may be used to identify exploitable weak points in a network and simulate attacks that attempt to exploit the identified weak points in the network may comprise one or more passive scanners configured to observe connections in the network to identify network addresses and open ports associated with the observed connections and one or more active scanners configured to scan the network to enumerate current connections in the network and identify network addresses and open ports associated with the current connections in the network. In addition, the system may further comprise one or more processors coupled to the one or more passive scanners and the one or more active scanners, wherein the one or more processors may be configured to model trust relationships and identify exploitable weak points in the network based on information associated with the connections observed with the one or more passive scanners and the current connections enumerated with the one or more active scanners, simulate an attack that uses the modeled trust relationships to target the exploitable weak points on a selected host in the network, and enumerate remote network addresses that could compromise the network and determine an exploitation path that the enumerated remote network addresses could use to compromise the network based on the simulated attack. In one implementation, the system may further comprise a log aggregator configured to collect events that describe activity in the network, wherein information associated with the collected events may be used to model the trust relationships and identify the exploitable weak points in the network.

According to one aspect of the invention, an exemplary method that may be used to identify exploitable weak points in a network and simulate attacks that attempt to exploit the identified weak points in the network may comprise configuring one or more passive scanners to identify network addresses and open ports associated with connections that the one or more passive scanners observe in the network and configuring one or more active scanners to enumerate current connections in the network and identify network addresses and open ports associated with the current connections enumerated with the one or more active scanners. In one implementation, the method may then model trust relationships and identify exploitable weak points in the network based on information associated with the connections observed with the one or more passive scanners and the current connections enumerated with the one or more active scanners, simulate an attack that uses the modeled trust relationships to target the exploitable weak points on a selected host in the network, wherein the simulated attack may be used to enumerate remote network addresses that could compromise the network and determine an exploitation path that the enumerated remote network addresses could use to compromise the network. Additionally, in one implementation, the method may further comprise configuring a log aggregator to collect events that describe activity in the network, wherein information associated with the events collected at the log aggregator may be used to model the trust relationships and identify the exploitable weak points in the network.

According to one aspect of the invention, an exemplary computer-readable storage medium that may be used to identify exploitable weak points in a network and simulate attacks that attempt to exploit the identified weak points in the network may comprise computer-executable instructions that, when executed on one or more processors, cause the one or more processors to configure one or more passive scanners to identify network addresses and open ports associated with connections that the one or more passive scanners observe in the network and configure one or more active scanners to enumerate current connections in the network and identify network addresses and open ports associated with the current connections enumerated with the one or more active scanners. In one implementation, the computer-executable instructions, when executed on the one or more processors, may further cause the one or more processors to model trust relationships and identify exploitable weak points in the network based on information associated with the connections observed with the one or more passive scanners and the current connections enumerated with the one or more active scanners. The modeled trust relationships may then be used to simulate an attack that targets the exploitable weak points on a selected host in the network to enumerate remote network addresses that could compromise the network and determine an exploitation path that the enumerated remote network addresses could use to compromise the network.

According to one aspect of the invention, the exemplary system, method, and computer-readable storage medium described above may identify exploitable weak points in the network that include, among other things, hosts that have internally exploitable services, hosts that have remotely exploitable services, hosts that have exploitable client software, and hosts that have exploitable client software and connect to remote networks or process content from the remote networks. For example, in one implementation, the hosts that have the internally exploitable services may include network addresses having exploitable services that permit remote or uncredentialed checks, network addresses having exploitable services on one or more predetermined ports, and network addresses having remotely exploitable patch audits associated with a low access complexity rating, and the hosts that have the remotely exploitable services may include network addresses having exploitable services that permit external access on one or more predetermined ports and one or more of the hosts that have the internally exploitable services that further correspond to network addresses paired with open ports that accept external connections. In one implementation, the hosts that have the exploitable client software may include network addresses having exploitable services on port zero and network addresses having remotely exploitable patch audits associated with one or more of a medium access complexity rating or a high access complexity rating, while the hosts that have the exploitable client software and connect to remote networks or process content from the remote networks may include one or more of the hosts that have the exploitable client software that further correspond to one or more of network addresses that are connected to destinations external to the network, network addresses that correspond to mobile devices, or network addresses that use one or more proxy or mail gateway protocols.

According to one aspect of the invention, the exemplary system, method, and computer-readable storage medium described above may further identify exploitable weak points in the network that include destination hosts that accept exploitable trust relationships from internally exploitable source hosts and destination hosts that accept exploitable trust relationships from remotely exploitable source hosts. For example, in one implementation, certain connections observed with the one or more passive scanners and enumerated with the one or more active scanners may relate to internal connections from source hosts to destination hosts in the network, wherein the modeled trust relationships associate network addresses corresponding to the destination hosts with network addresses corresponding to the source hosts that have connected thereto. As such, the remotely exploitable source hosts associated with the exploitable trust relationships may include network addresses that correspond to the source hosts that have connected to the destination hosts and further correspond to one or more of the hosts that have the remotely exploitable services or the hosts that have exploitable client software and connect to remote networks or process content from the remote networks, and the internally exploitable source hosts associated with the exploitable trust relationships may include network addresses that correspond to the source hosts that have connected to the destination hosts and further correspond to one or more of the hosts that have the internally exploitable services or the hosts that have exploitable client software. However, in one implementation, the internally exploitable source hosts may exclude network addresses that are included among the remotely exploitable source hosts.

According to one aspect of the invention, the exemplary system, method, and computer-readable storage medium described above may further select the host associated with the simulated attack among the hosts that have the internally exploitable services, wherein the selected host comprises a destination host selected from among the destination hosts associated with the identified internal connections. In one implementation, the modeled trust relationships may then be used to determine network addresses that correspond to the source hosts that have observed or enumerated connections to the network address associated with the selected host and the determined network addresses that correspond to the source hosts that have connected to the selected host may be processed (e.g., in an iterative manner) to enumerate the remote network addresses that could compromise the network and determine the exploitation path that the enumerated remote network addresses could use to compromise the network based on the simulated attack. For example, the network addresses that correspond to the source hosts that have connected to the selected host may be processed using a simulation algorithm that includes selecting a current network address among the network addresses that have connected to the selected host and adding the current network address to the enumerated remote network addresses that could compromise the network if the source host associated therewith connects to the selected host on an exploitable port. Furthermore, if the source host associated with the current network address connects to the selected host on an exploitable port, the exploitation path may include an exploit that was used to connect to the selected host on the exploitable port. Additionally, in one implementation, the modeled trust relationships may be used to determine second order network addresses that correspond to source hosts that have connected to the current network address if the hosts that have the internally exploitable services include the source host associated with the current network address. However, the second order network addresses may exclude network addresses among one or more of the enumerated remote network addresses that could compromise the network or the hosts that have the internally exploitable services. In one implementation, in response to determining that the source host associated with the current network address has one or more second order network addresses that connect thereto, the simulation algorithm may be further executed to iteratively process the second order network addresses until no further second order network addresses are determined.

Other objects and advantages associated with the aspects and implements described herein will be apparent to those skilled in the pertinent art based on the accompanying drawings and the following detailed description.

DETAILED DESCRIPTION

Figure 1:
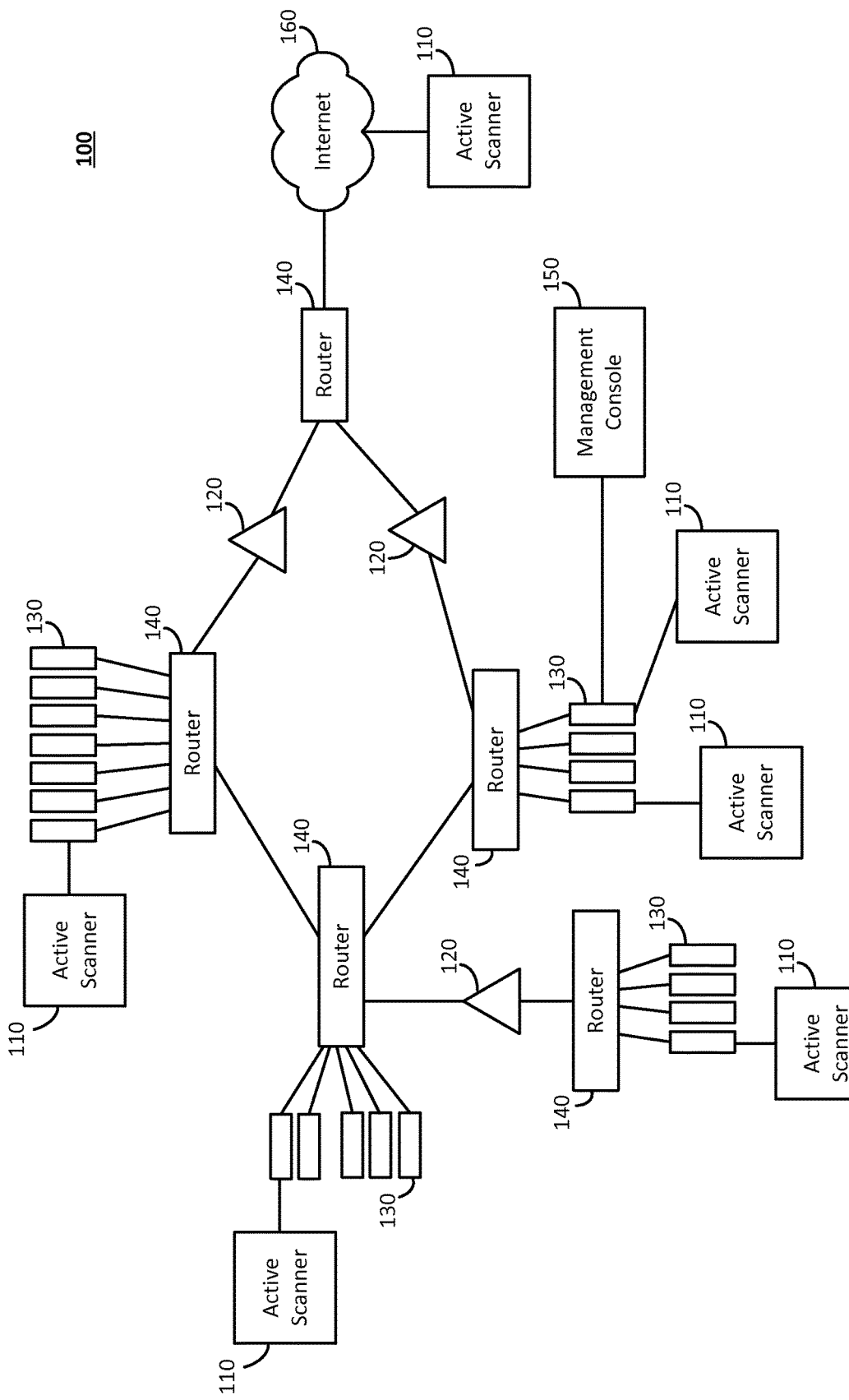
FIGS. 1 and 2 illustrate exemplary systems to identify exploitable weak points in a network and simulate attacks paths that may potentially exploit the identified weak points in the network, according to one aspect of the invention.

According to one aspect of the invention, FIG. 1 illustrates an exemplary system 100 to identify exploitable weak points in a network and simulate attacks paths that may potentially exploit the identified weak points in the network. In particular, the system 100 shown in FIG. 1 may generally include one or more active scanners 110 that can communicate packets or other messages within the network to detect new or changed information describing various routers 140, hosts 130, servers 130, or other devices 130 in the network. For example, in one implementation, the active scanners 110 may perform credentialed audits or uncredentialed scans to scan certain hosts 130, servers 130, or other devices 130 in the network and obtain information that may then be analyzed to identify potential vulnerabilities in the network. More particularly, in one implementation, the credentialed audits may include the active scanners 110 using suitable authentication technologies to log into and obtain local access to the hosts 130, servers 130, or other devices 130 in the network and perform any suitable operation that a local user could perform thereon without necessarily requiring a local agent. As such, the credentialed audits performed with the active scanners 110 may be used to obtain highly accurate host-based data that includes various client-side issues (e.g., missing patches, operating system settings, locally running services, etc.). On the other hand, the uncredentialed audits may generally include network-based scans that involve communicating packets or messages to the hosts 130, servers 130, or other devices 130 in the network and observing responses thereto in order to identify certain vulnerabilities (e.g., that a particular host 130 accepts spoofed packets that may expose a vulnerability that can be exploited to close established connections). Additionally, in one implementation, the system 100 may further include one or more passive scanners 120 that can observe traffic traveling in the network to further identify potential vulnerabilities in the network and detect activity that may potentially target or otherwise attempt to exploit the vulnerabilities that the active scanners 110 and/or the passive scanners 120 previously identified. In one implementation, the active scanners 110 may include Nessus® vulnerability and configuration assessment products, available from Tenable Network Security®, and the passive scanners 120 may include the Tenable Passive Vulnerability Scanner, also available from Tenable Network Security®.

In one implementation, as noted above, the active scanners 110 may obtain local access to hosts 130, servers 130, or other devices 130 in the network (e.g., in a credentialed audit) and/or communicate various packets or other messages within the network to illicit responses from the hosts 130, servers 130, or other devices 130 (e.g., in an uncredentialed scan). In contrast, the passive scanners 120 may generally observe (or "sniff") various packets or other messages in the traffic traversing the network to passively scan the network. In particular, the passive scanners 120 may reconstruct one or more sessions in the network from information contained in the sniffed traffic, wherein the reconstructed network sessions may then be used in combination with the information obtained with the active scanners 110 to build a model or topology describing the network. For example, in one implementation, the model or topology built from the information obtained with the active scanners 110 and the passive scanners 120 may describe any routers 140, hosts 130, servers 130, or other devices 130 detected or actively running in the network, any services or client-side software actively running or supported on the routers 140, hosts 130, servers 130, or other devices 130, and trust relationships associated with the various routers 140, hosts 130, servers 130, or other devices 130, among other things. In one implementation, the passive scanners 120 may further apply various signatures to the information in the observed traffic to identify network vulnerabilities and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to any new or changed information in the network.

In one implementation, as noted above, the passive scanners 120 may generally observe the traffic traveling across the network to reconstruct one or more sessions occurring in the network, which may then be analyzed to identify potential vulnerabilities in the network and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network). Accordingly, the passive scanners 120 may monitor the network in real-time to detect any potential vulnerabilities in the network in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network from the encrypted and interactive network sessions (e.g., a new e-commerce server 130 may be identified in response to the passive scanners 120 observing an encrypted and/or interactive session between a certain host located in a remote network 160 and a certain port on the server 130 that processes electronic transactions). In one implementation, the passive scanners 120 may observe as many sessions in the network as possible to provide optimal visibility into the network and the activity that occurs in the network. For example, in one implementation, the passive scanners 120 may be deployed at a network hub 140, a spanned switch port 140, a network tap 140, a network choke point 140, a dial up node 130, a server farm 130, behind a firewall, or any other suitable location that enables the passive scanners 120 to observe incoming and outgoing traffic in the network. In one implementation, the passive scanners 120 may generally be deployed on any suitable server 130 or other host 130 in the network that runs a suitable operating system (e.g., a Red Hat Linux or FreeBSD open source operating system, a UNIX, Windows, or Mac OS X operating system, etc.).

Furthermore, in one implementation, the system 100 shown in FIG. 1 may further include a management console 150 (e.g., Tenable SecurityCenter™, available from Tenable Network Security®), which may provide a unified security monitoring solution to manage the vulnerabilities and the various routers 140, hosts 130, servers 130, or other devices 130 in the network. In particular, the management console 150 may aggregate the information obtained from the active scanners 110 and the passive scanners 120 to build or update the model or topology associated with the network, which may generally include real-time information describing various vulnerabilities, applied or missing patches, intrusion events, anomalies, event logs, file integrity audits, configuration audits, or any other information that may be relevant to managing the vulnerabilities and assets in the network. As such, the management console 150 may provide a unified interface to mitigate and manage governance, risk, and compliance across the network. In one implementation, further detail relating to interaction between the management console 150, the active scanners 110, and the passive scanners 120 may be found in "Unified Security Monitoring (USM): Real-Time Situational Awareness of Network Vulnerabilities, Events and Configurations," the contents of which are hereby incorporated by reference in their entirety.

Figure 2:
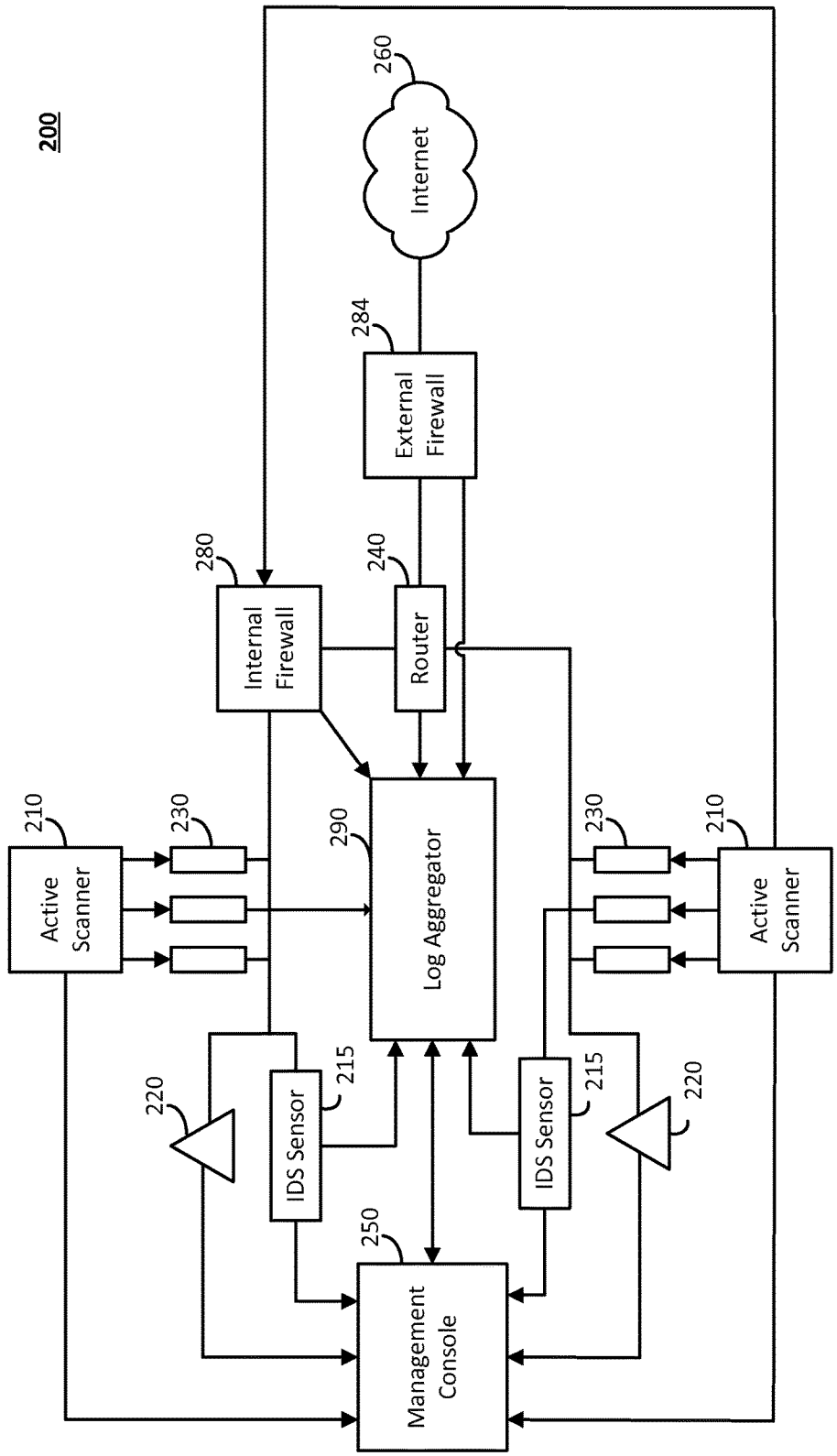

According to one aspect of the invention, FIG. 2 illustrates another exemplary system 200 to identify exploitable weak points in a network and simulate attacks paths that may potentially exploit the identified weak points in the network. In particular, the system 200 shown in FIG. 2 may generally have various components and provide substantially similar functionality to the system 100 shown in FIG. 1 and described in further detail above. For example, in one implementation, the system 200 may include one or more active scanners 210, which may interrogate devices 230 in the network to build a model or topology of the network and identify various vulnerabilities in the network, one or more passive scanners 220 that can passively observe traffic in the network to further build the model or topology of the network, further identify vulnerabilities in the network, and detect activity that may potentially target or otherwise exploit the vulnerabilities. Additionally, in one implementation, the system 200 may further include a log aggregator 290 (e.g., the Tenable Log Correlation Engine, available from Tenable Network Security®), which may receive logs containing events from various sources distributed across the network. For example, in one implementation, the logs received at the log aggregator 290 may be generated by internal firewalls 280, external firewalls 284, routers 240, servers 230, devices 230, operating systems, applications, or any other suitable source in the network. Accordingly, in one implementation, the information obtained from the active scanners 210, the passive scanners 220, and the log aggregator 290 may be provided to the management console 250 to generate or update a comprehensive model describing topologies, vulnerabilities, assets, and other information associated with the network.

In one implementation, the active scanners 210 may be distributed in locations across the network to reduce stress on the network. For example, the active scanners 210 may be distributed at different locations in the network in order to scan certain portions of the network in parallel, whereby an amount of time to perform the active scans may be reduced. Furthermore, in one implementation, one or more of the active scanners 210 may be distributed at a location that provides visibility into portions of a remote network 260. For example, as shown in FIG. 1, one or more of the active scanners 210 may be distributed at a location in communication with a remote network 260, wherein the term "remote network" used herein may refer to the Internet, a partner network, or any other suitable external network. As such, the terms "remote network," "external network," "partner network," and "Internet" may all be used interchangeably to suitably refer to one or more outside networks, while references to "the network" and/or "the internal network" may generally refer to the areas that the systems and methods described herein may be used to protect or otherwise manage. Accordingly, in one implementation, limiting the portions in the network and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets (e.g., routers 240, internal firewalls 280, external firewalls 284, servers 230, hosts 230, devices 230, etc.). In particular, because the active scanners 210 may scan limited portions of the network rather than the entire network, and further because the parallel active scans may obtain information from the different portions of the network, the overall amount of time that the active scans consume may substantially correspond to the amount of time associated with one active scan.

As such, in one implementation, the active scanners 210 may generally scan the respective portions of the network to obtain information describing vulnerabilities and assets in the respective network portions. In particular, as described in "Unified Security Monitoring (USM): Real-Time Situational Awareness of Network Vulnerabilities, Events and Configurations," the contents of which are incorporated by reference above, the active scanners 210 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, in one implementation, the active scanners 210 may perform the various active probes to obtain a snapshot that describes assets actively running in the network at a particular point in time (e.g., actively running routers 240, internal firewalls 280, external firewalls 284, servers 230, hosts 230, etc.), wherein the snapshot may further include any exposures that the actively running assets to vulnerabilities identified in the network (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network. In one implementation, in response to obtaining the snapshot of the network, the active scanners 210 may then report the information describing the snapshot to the management console 250, which may use the information provided by the active scanners 210 to remediate and otherwise manage the vulnerabilities and assets in the network.

Furthermore, in one implementation, the passive scanners 220 may be distributed at various locations in the network to monitor traffic traveling across the network, traffic originating within the network and directed to the remote network 260, and traffic originating within the remote network 260 and directed to the network, thereby supplementing the information obtained with the active scanners 210. For example, in one implementation, the passive scanners 220 may monitor the traffic traveling across the network and the traffic originating from and/or directed to the remote network 260 to identify vulnerabilities, assets, or information from that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system sensor 215 identifies. In one implementation, the intrusion detection system may generally include an open source network intrusion prevention and detection system (e.g., Snort), a packet analyzer, or any other system that having a suitable sensor 215 that can detect and prevent intrusion or other security events in the network.

Thus, the passive scanners 220 may generally sniff one or more packets or other messages in the traffic traveling across, originating from, or directed to the network to identify new routers 240, internal firewalls 280, external firewalls 284, or other hosts 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network. In one implementation, the information that the passive scanners 220 obtains from sniffing the traffic traveling across, originating from, or directed to the network may therefore provide a real-time record describing the activity that occurs in the network. Accordingly, in one implementation, the passive scanners 220 may behave like a security motion detector on the network, mapping and monitoring any vulnerabilities, assets, services, applications, sensitive data, and other information that newly appear or change in the network. The passive scanners 220 may then report the information obtained from the traffic monitored in the network to the management console 250, which may use the information provided by the passive scanners 220 in combination with the information provided from the active scanners 210 to remediate and otherwise manage the network.

In one implementation, as noted above, the system 200 shown in FIG. 2 may further include a log aggregator 290, which may receive logs containing one or more events from various sources distributed across the network (e.g., logs describing network activity, operating system events, file modification events, USB device insertion events, etc.). In particular, the logs received at the log aggregator 290 may include events generated by one or more of the internal firewalls 280, external firewalls 284, routers 240, servers 230, devices 230, or other hosts 230 in the network in addition to events generated by one or more operating systems, applications, or other sources in the network. For example, in one implementation, the log aggregator 290 may normalize the events contained in the various logs received from the sources distributed across the network, and in one implementation, may further aggregate the normalized events with information describing the snapshot of the network obtained by the active scanners 210 and/or the network traffic observed by the passive scanners 220. Accordingly, in one implementation, the log aggregator 290 may analyze and correlate the events contained in the logs, the information describing the observed network traffic, and/or the information describing the snapshot of the network to automatically detect statistical anomalies, correlate intrusion events or other events with the vulnerabilities and assets in the network, search the analyzed and correlated information for data meeting certain criteria, or otherwise manage vulnerabilities and assets across the network.

Furthermore, in one implementation, the log aggregator 290 may filter the events contained in the logs, the information describing the observed network traffic, and/or the information describing the snapshot of the network to limit the information that the log aggregator 290 normalizes, analyzes, and correlates to information relevant to a certain security posture (e.g., rather than processing thousands or millions of events generated across the network, which could take a substantial amount of time, the log aggregator 290 may identify subsets of the events that relate to particular intrusion events, attacker network addresses, assets having vulnerabilities that the intrusion events and/or the attacker network addresses target, etc.). Alternatively (or additionally), the log aggregator 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). Thus, the log aggregator 290 may aggregate, normalize, analyze, and correlate information received in various event logs, snapshots obtained by the active scanners 210, and/or the activity observed by the passive scanners 220 to comprehensively monitor, remediate, and otherwise manage the vulnerabilities and assets in the network. Additionally, in one implementation, the log aggregator 290 may report information relating to the information received and analyzed therein to the management console 250, which may use the information provided by the log aggregator 290 in combination with the information provided by the passive scanners 220 and the active scanners 210 to remediate or otherwise manage the network.

Accordingly, in one implementation, the active scanners 210 may generally interrogate any suitable device 230 in the network to obtain information describing a snapshot of the network at any particular point in time, the passive scanners 220 may continuously or periodically observe traffic traveling in the network to identify vulnerabilities, assets, or other information that further describes the network, and the log aggregator 290 may collect additional information to further identify the vulnerabilities, assets, or other information describing the network. The management console 250 may therefore provide a unified solution that aggregates the vulnerability and asset information obtained by the active scanners 210, the passive scanners 220, and the log aggregator 290 to comprehensively manage governance, risk, and compliance across the network.

In one implementation, further detail relating to exemplary features associated with the systems shown in FIGS. 1 and 2 may be provided, for example, in U.S. patent application Ser. No. 10/863,238, entitled "System and Method for Managing Network Vulnerability Analysis Systems," which issued as U.S. Pat. No. 7,926,113 on Apr. 12, 2011, U.S. patent application Ser. No. 11/016,761, entitled "System and Method for Scanning a Network," which issued as U.S. Pat. No. 7,761,918 on Jul. 20, 2010, U.S. patent application Ser. No. 12/693,803, entitled "System and Method for Correlating Network Identities and Addresses," filed Jan. 26, 2010, U.S. patent application Ser. No. 12/695,659, entitled "System and Method for Enabling Remote Registry Service Security Audits," filed Jan. 28, 2010, U.S. patent application Ser. No. 12/729,036, entitled "System and Method for Passively Identifying Encrypted and Interactive Network Sessions," filed Mar. 22, 2010, U.S. patent application Ser. No. 12/775,120, entitled "System and Method for Three-Dimensional Visualization of Vulnerability and Asset Data," filed May 6, 2010, and U.S. patent application Ser. No. 13/403,108, entitled "System and Method for Using File Hashes to Track Data Leakage and Document Propagation in a Network," filed Feb. 23, 2012, the contents of which are each hereby incorporated by reference in their entirety.

Furthermore, as will be described in greater detail below with reference to FIGS. 3 through 7, the systems shown in FIGS. 1 and 2 may implement various algorithms or otherwise have various features and capabilities that may be used to leverage information discovered or otherwise obtained via the active scanners 210, the passive scanners 220, and the log aggregator 290 to identify exploitable services, exploitable client software, exploitable trust relationships, and other weak points in the network and simulate hacking via server-side exploits to enumerate network addresses that could potentially exploit the identified weak points in the network through one or more hops.

Figure 3:
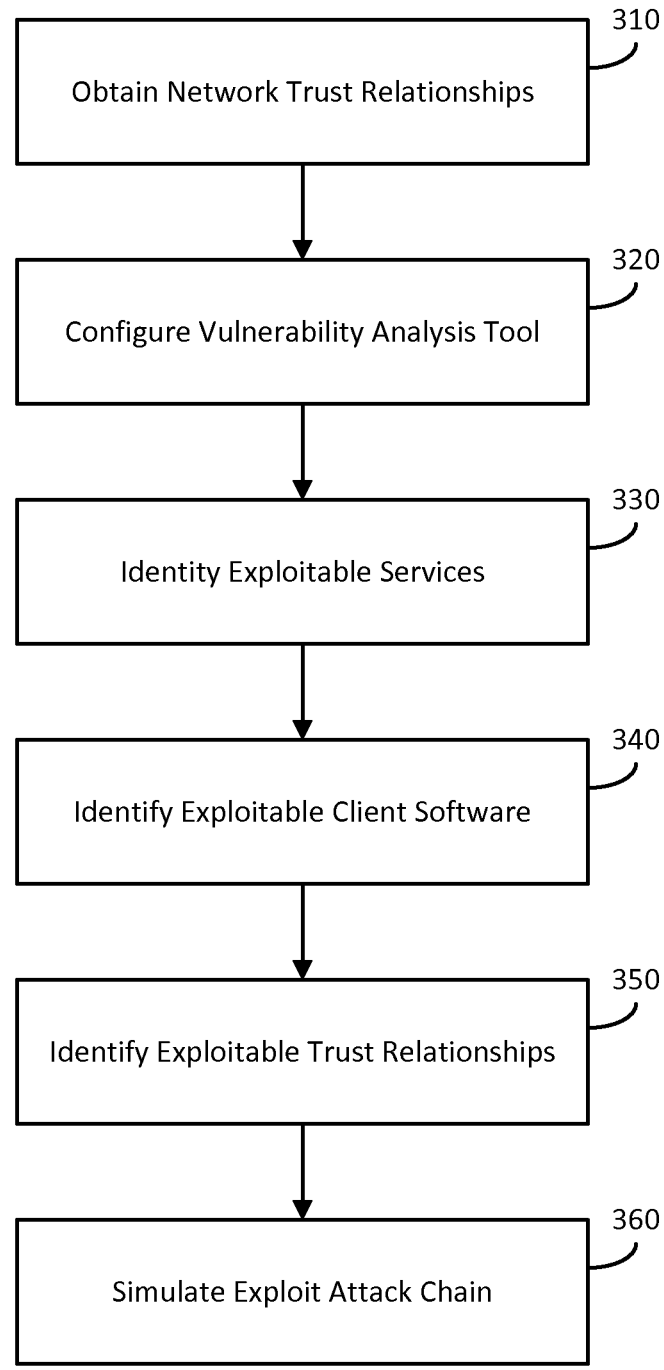
FIG. 3 illustrates an exemplary method to identify exploitable weak points in a network and simulate attacks paths that may potentially exploit the identified weak points in the network, according to one aspect of the invention.

According to one aspect of the invention, FIG. 3 illustrates an exemplary method 300 to identify exploitable weak points in a network and simulate attacks paths that may potentially exploit the identified weak points in the network. In particular, the method 300 shown in FIG. 3 may leverage information that one or more passive scanners obtain from observed traffic in a network in combination with unique audits performed with one or more active scanners, information collected at a log aggregator, and continuous network analysis performed with the passive scanners to identify network systems or vulnerabilities that can be exploited in various scenarios. For example, the exploitable network systems or exploitable network vulnerabilities may relate to exploitable services that are visible from remote networks, clients that access remote networks and are susceptible to exploits from malicious content, exploitable clients that have trust relationships with internal servers or hosts, and clients that access remote networks and have trust relationships with exploitable internal servers or hosts, among other things. Accordingly, the method 300 shown in FIG. 3 may support automatically and/or manually analyzing vulnerability data to identify high value network clients that are susceptible to network attacks, servers (which may or may not already be fully patched) that are managed with high-risk clients, or various other exploitable network vulnerabilities. In one implementation, to produce the vulnerability analysis that identifies the weak points in the network and simulate attack paths directed thereto, the method 300 may include various operations that involve discovery, asset classification, reporting, and filtering on the vulnerability data obtained with the active and passive scanners to identify monitored systems that share certain exploitable properties (e.g., accessing remote networks).

In general, the following description assumes that a person skilled in the pertinent art will have an understanding relating to various key functions that the active scanners, the passive scanners, the log aggregator, and other components perform, particularly based on the description provided above with reference to FIGS. 1 and 2. However, to aid in understanding the following description, the following table provides a description relating to certain key functions and terms in short detail:

TABLE 1

Key Functions and Terms

| Function or Term | Description |
|---|---|
| Credentialed Audits | Highly accurate patch audits that include client-side issues. |
| Uncredentialed Scans | Vulnerability results from servers that often do not include client-side issues. |
| Client-Side Port Usage | An audit that reports which ports a system browses from. |
| Connection Tracking | An audit that tracks a trust relationship between two IP addresses and a particula port. |
| Accepts External Connections | An audit that identifies services that accept connections from external addresses on remote networks. |
| Client Vulnerabilities | Security issues that affect software that typically does not require an open TCP or UDP service (e.g., email, web, chat, etc.). |
| Saved Query | A complex filter that saves vulnerability parameters that can be subsequently used and referenced. |
| Repository | A construct to place certain vulnerability data types (e.g., scan results from external active scanners) in a logically addressable unit. |
| Hash, Table, and/or List | Interchangeable terms that may be used to reference data models or data structure that describe what information should be tracked therein. |
| Static Asset List | IP addresses that were manually created or |

TABLE 1-continued

Key Functions and Terms

| Function or Term | Description |
| --- | --- |
| | saved to represent a snapshot from a certain vulnerability filter. |
| Dynamic Asset List | IP addresses that met criteria defining certain qualities based on the information collected with the active or passive scanners. |
| Exploitable Vulnerabilities | Any vulnerability having one or more publicly released exploits. |
| Vulnerability Text Filtering | Performing a string search on existing vulnerability results. |
| Internet Facing | Ports, services, or daemons that are generally open to direct access from external IP addresses. |
| Exploitable | Any vulnerability having one or more publicly released exploits. |
| Client-Side Exploits | A vulnerable client (e.g., a web browser) that can only be exploited if a user accesses malicious content to exploit the host. |
| Server Exploits | A vulnerable service that could be exploited with an attack if the service allows a connection thereto. |
| DMZ | A "de-militarized zone" that references one or more servers placed outside an internal network to offer services directly to remote networks. |

In one implementation, the method 300 illustrated in FIG. 3 may include an operation 310 to obtain trust relationships in the network via one or more passive scanners. For example, in one implementation, the trust relationships obtained via the one or more passive scanners may include open ports in the network, client-side port usage in the network, hosts in the network that are connected to other systems, and hosts in the network that accept external connections. In one implementation, one or more active scanners may further obtain certain trust relationships in operation 310, which may include open ports in the network, client-side port usage read from netstat connection information, or other suitable trust relationships. For example, the active scanners may obtain the netstat connection information in a credentialed audit that can enumerate permanent connections in the network, current connections in the network at a particular point in time, and certain open ports in the network (e.g., open ports associated with network connections that may be part of a botnet, accept incoming messages that could possibly lead to a denial of service attack, etc.). In one implementation, the trust relationships obtained via the active scanners may build upon the trust relationships obtained via the passive scanners in that the active scanners do not need to sniff traffic in the network, whereas the passive scanners may generally be limited to sniffing network traffic (e.g., on a perimeter of the network) and therefore potentially lack visibility into internal network connections. Further, in one implementation, queries to a log aggregator may be performed in operation 310 to further obtain certain trust relationships. For example, the passive scanners may depend on observed connections to identify trust relationships, whereby trust achieved from a first computer connecting to a second computer over the network and then connecting from the second computer to a third computer in a manner may not be visible to the passive scanners and possibly escape detection (e.g., the passive scanners may not have visibility into traffic that relate to web interfaces used to manage virtual machines or other network services, keyboard-video-mouse functions that a particular computer provides to others, etc.). As such, in one implementation, the log aggregator may collect events describing network activity that may not be visible to the passive and active scanners, whereby the queries to the log aggregator that are performed in operation 310 may be used to derive additional trust relationships from the events collected at the log aggregator.

In one implementation, an operation 320 may then configure a vulnerability analysis tool to identify the exploitable weak points in the network and simulate the attacks paths that may potentially exploit the identified weak points in the network. For example, configuration operation 320 may include obtaining credentials to log into a management console that aggregates discovery results obtained via the active scanners, the passive scanners, and the log aggregator, defining an optional repository list to focus the analysis on (where the default list may include all available repositories), listing known attacker network addresses, attack destination network addresses, and attack types (where attack type may include any, server, and/or client types), listing global filters to ignore in the analysis (e.g., hosts, passive and active scanner plug-ins, ports, etc.), defining an output format (e.g., a text file, a file formatted in accordance with the active scanners, etc.), indicating whether to upload the results from the attack path simulation back to the management console (including a target repository to store the results), and defining a hard coded trust relationship list between network addresses that will be added to the passive scanner trust relationship results obtained in operation 310.

In one implementation, an operation 330 may then identify exploitable services in the network. For example, operation 330 may generally list all remotely exploitable issues associated with particular hosts in the network, as will be described in further detail below with reference to FIG. 4. In one implementation, an operation 340 may then identify exploitable client software in the network. For example, operation 340 may generally identify one or more hosts in the network that process Internet content (e.g., e-mail, web pages, chat, file transfers, etc.), as will be described in further detail below with reference to FIG. 5. In one implementation, an operation 350 may then identify exploitable trust relationships in the network. For example, as will be described in further detail below with reference to FIG. 6, operation 350 may generally identify hosts in the network that accept trust relationships from certain other hosts that are exploitable in various manners based on network addresses that have exploits accessible from the Internet, internal network addresses that have exploitable services, internal network addresses that have exploitable clients, and internal network addresses that have exploitable clients and surf the Internet or process Internet content.

In one implementation, an operation 360 may then simulate an exploit attack chain associated with each potentially exploitable server identified in the network. For example, as will be described in further detail below with reference to FIG. 6, known trust relationships associated with each identified server may be modeled in operation 360 as available access control paths and attempted hacking via server-side exploits may be simulated to enumerate all network addresses that could potentially exploit the server via one or more "hops." In one implementation, operation 360 may further have iterative aspects that may be used to continue expanding a tree that includes the available access control paths from second order clients. In particular, the second order clients may represent clients that can exploit the server from network addresses that are associated with exploitable services, client software, and/or trust relationships. However, in one implementation, certain modifications may be made to the exploit attack simulation performed in operation 360 depending on the particular network context. For example, in a large network that has an exploitable IMAP service and a substantial number of known clients, operation 360 may not necessarily process each known client for second order attacks nor report all known clients as potential exploit sources to avoid reporting unwieldy results. However, if the IMAP service has a vulnerable and exploitable Secure Shell (SSH) service, operation 360 may simulate certain attacks to identify client-side exploits that could potentially be used against the clients using the vulnerable IMAP service and determine whether the identified client-side exploits could be used to access other systems.

In one implementation, operations 330 through 360 may generally be performed sequentially in order to simplify the algorithms used to identify the exploitable services, exploitable client software, and exploitable trust relationships and to simulate the exploit attack chains that may potentially target the exploitable services, client software, and trust relationships identified in operations 330 through 350. As such, when operations 330 through 360 are performed sequentially, each operation may generally include on one or more queries and/or cross-references to data associated with prior operations (e.g., operation 330 may include querying and/or cross-referencing data associated with the trust relationships obtained in operation 310 and certain configuration data specified in operation 320 in order to identify the exploitable services, operation 340 may query and/or cross-reference data associated with the trust relationships obtained in operation 310, configuration data specified in operation 320, and exploitable services identified in operation 330 to identify the exploitable client software, etc.). However, those skilled in the art will appreciate that in certain implementations one or more of operations 330 through 360 may be performed in parallel or within a single larger query, in which case the data obtained therein may be subject to post-processing in order to generate suitable reports that describe certain exploitable services, client software, and trust relationships in addition to the exploit attack chains that may potentially target the same.

Furthermore, those skilled in the pertinent art will appreciate that various changes and modifications may be made to the above description relating to method 300 shown in FIG. 3 and/or the following description that provides more detail relating to particular techniques that may be used therein. For example, the passive scanners may not differentiate services that have limited inbound access from services that permit general connections (e.g., a firewall rule that only allows traffic on a particular port from a few hosts versus a service that permits any and all traffic on a certain port). As such, certain operations may employ various filters or other mechanisms to prevent over-emphasizing certain vulnerabilities and further to provide greater emphasis on other vulnerabilities. For example, in one implementation, certain service, client software, and/or trust relationship vulnerabilities may be associated with an exploitability model based on a Common Vulnerability Scoring System (CVSS) or other scoring mechanism, wherein the vulnerabilities and other weak points identified in the network may be filtered and limited to those that have a "HIGH" severity or a CVSS score that exceeds a certain threshold. In this manner, the analysis may filter or reduce the emphasis associated with vulnerabilities that do not pose a substantial risk to the network (e.g., services that only expose a host to traffic from a remote trusted VPN, hosts that are missing a patch but not actually running a process that requires the missing patch, etc.). However, those skilled in the art will further appreciate that the exploitable model may be binary to simply indicate whether or not a particular exploit exists. Furthermore, the filters may eliminate subsequent correlations that relate to a previously identified vulnerability to simplify and streamline the analysis. For example, a particular host may be exploitable on many different ports, in which case all the exploitable ports would be tracked, but if the host has multiple exploits on the same port, only the first exploit would be tracked to focus the vulnerability analysis on the exploitable port rather than every possible exploit on that port.

Figure 4:
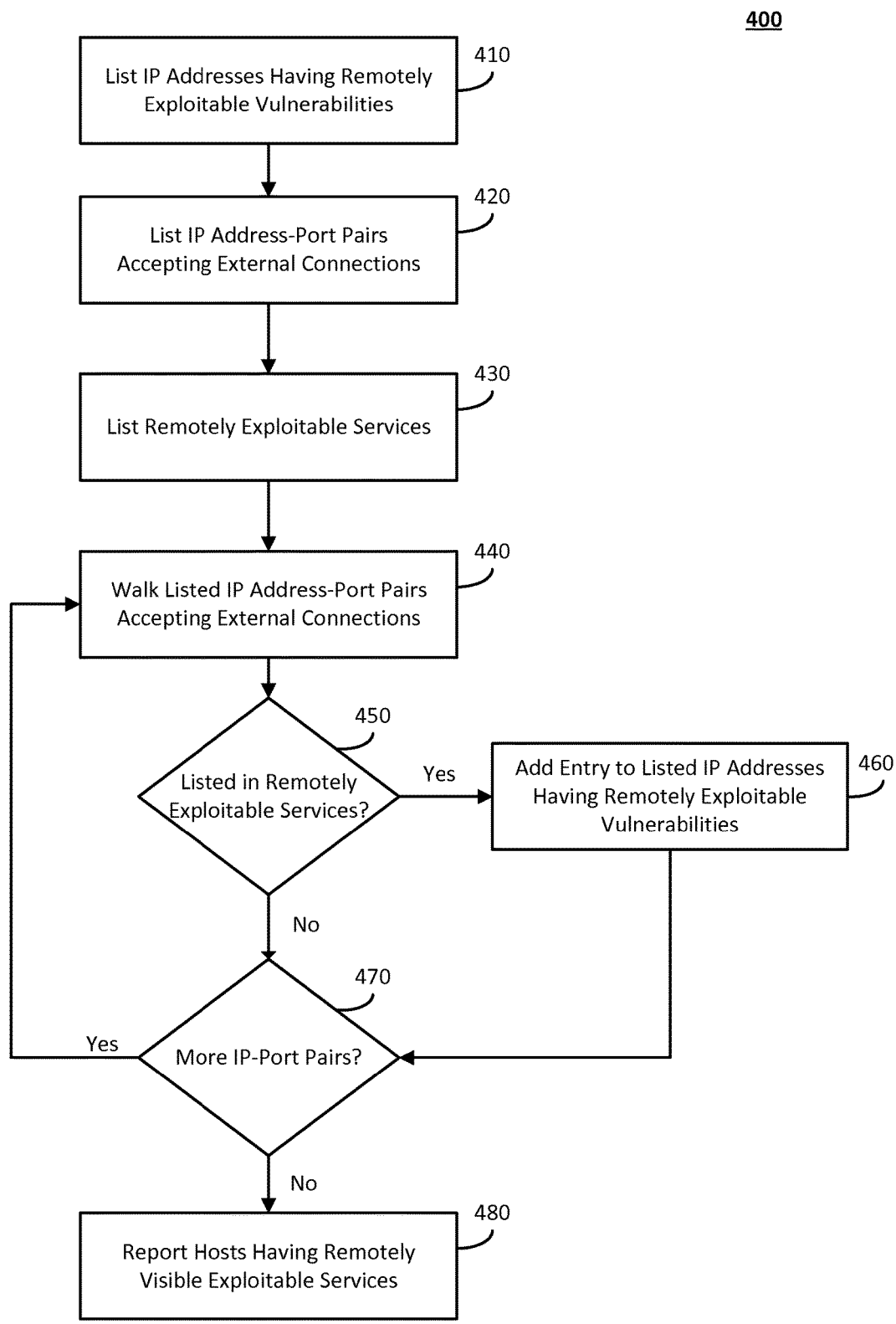
FIG. 4 illustrates an exemplary method to identify exploitable network services that have visibility from remote networks, according to one aspect of the invention.

According to one aspect of the invention, FIG. 4 illustrates an exemplary method 400 to identify exploitable network services that have visibility from remote networks. In particular, the method 400 may generally be performed in connection with operation 330 in FIG. 3 to identify one or more hosts in a network that have remotely exploitable service vulnerabilities. For example, in one implementation, one or more passive scanners may observe traffic in the network in a substantially continuous manner to identify vulnerable services on externally available ports, which may then be cross-referenced with vulnerable services that are identified with one or more active scanners to identify the exploitable network services that are visible from remote networks.

Accordingly, in one implementation, the method 400 shown in FIG. 4 may include an operation 410 in which one or more suitable repositories may be queried to obtain information describing the vulnerable services that the one or more passive scanners identified on the externally available ports. In one implementation, operation 410 may use a filter to ignore results obtained in the query that relate to certain predefined service vulnerabilities. For example, in one implementation, the filter may be used to ignore service vulnerabilities defined in a configuration file, service vulnerabilities on certain ports (e.g., requiring the service to run on a port greater than or equal to one in order to avoid services running on port 0 that may relate to UNIX local checks), service vulnerabilities that do not permit external access or otherwise accept incoming connections, service vulnerabilities that are not exploitable (i.e., do not have a publicly released exploit), and/or service vulnerabilities that have a CVSS score below a certain threshold (e.g., because many high-risk vulnerabilities may have reliable exploits that have not been made public). As such, in one implementation, operation 410 may use the filter to ensure that only certain service vulnerabilities are considered, including those that are exploitable and permit external access or otherwise face remote networks, among other possible criteria. In one implementation, operation 410 may then create one or more records in an InternetRemoteExploitIPs data structure to list each IP address having remotely exploitable vulnerabilities that meet the filter criteria, wherein each IP address listed in the InternetRemoteExploitIPs data structure may be associated with the ports and service vulnerabilities found thereon. For example, if the passive scanners detected a PHP vulnerability on port 80 and further observed that port participating in network connections external to the local network, a record created in the InternetRemoteExploitIPs data structure may list IP addresses associated with one or more hosts that had the PHP vulnerability in addition to the port on which the PHP vulnerability was found.

In one implementation, an operation 420 may then identify one or more services on the network that accept connections directly from remote networks and IP addresses, ports, locations, or other information associated with the identified services. In general, the services identified in operation 420 that accept connections from remote networks may include any suitable services located on a network perimeter, available in a DMZ, and/or deployed within the network yet remotely addressable. For example, a network that does not have a DMZ may use port forwarding to expose SSH, websites, and VNC services to external connections, while larger networks may further expose one or more DMZs, multiple DMZ layers, external hosting, and other services to external connections. Accordingly, operation 420 may use information obtained with the passive scanners in combination with the active scanners to audit the network (especially firewall and router configurations) to identify open ports in the network and thereby identify which services are exposed to remote networks and potentially represent attack points to leapfrog into the internal network.

For example, in one implementation, operation 420 may deploy one or more active scanners external to the network and/or connect to a perimeter scanning service that can perform rapid external active scans to identify network hosts that face remote networks and/or network hosts that face remote networks on particular ports. In one implementation, performing external scans may ensure that the services identified in operation 420 contribute to external risk profiles (i.e., are remotely visible) because a firewall protecting the network may only allow traffic from remote networks on certain ports. In other words, any ports that are only open behind the firewall may not be remotely accessible and can therefore be ignored or otherwise filtered from the services identified in operation 420. Furthermore, in one implementation, the external scans performed in operation 420 may include full TCP and UDP port scans to ensure that all ports open to remote networks will be found. Alternatively (or additionally), operation 420 may deploy one or more passive scanners to monitor external network traffic, which may readily identify any host or service in use, including TCP and UDP services. In one implementation, the external network traffic monitored with the passive scanners may then be filtered to identify unique IP address and port combinations that serve content directly to and/or receive content directly from remote networks. As such, in one implementation, the passive scanners may monitor the external network traffic to identify network hosts that face remote networks and/or network hosts that face remote networks on particular ports.

In one implementation, information obtained in the external scans (whether with externally deployed active scanners, the perimeter scanning service, and/or the passive scanners) may be stored in a suitable repository dedicated to external scans, which may enable manipulating and reporting on external scan results separately from internal scan results. However, those skilled in the art will appreciate that external and internal scan results may be stored in the same repository. In one implementation, in response to suitably identifying the network services that accept connections from remote networks, operation 420 may then save a hash index created from each IP address and port pair corresponding thereto in an InternetRemotePorts data structure that uniquely identifies each service accepting connections from remote networks, wherein the information in the InternetRemotePorts data structure may subsequently be cross-referenced with internal service auditing results.

In one implementation, an operation 430 may then use the active scanners to determine which hosts or services facing remote networks may be remotely exploitable and build upon the passively identified remotely exploitable vulnerabilities that were identified in operation 410. In particular, the active scanners may perform credentialed checks in operation 430 on certain ports that may be considered open, meaning that patch audits relating to "local" checks may report vulnerabilities on certain ports that should be filtered from the remotely exploitable service results (e.g., avoiding port 0 used in UNIX local checks, port 139 used in certain Windows local checks, port 445 used to carry data relating to Windows file sharing and other services, etc.). Accordingly, as will be described in further detail herein, operation 430 may use various queries and filters to list IP addresses that have issues relating to remotely exploitable services, which may be saved in an ExploitableServices data structure based on hashes between the IP addresses and ports associated with each remote exploit issue.

More particularly, in one implementation, operation 430 may include one or more queries to identify exploitable services that are vulnerable to remote or uncredentialed checks. For example, various vulnerable services may allow remote code execution that could potentially be used to perform a remote check or an uncredentialed check that can exploit the service (e.g., services running on port 445, iTunes services, etc.). In one implementation, an entry that includes a hash between the IP address and port corresponding to each service vulnerable to remote or uncredentialed checks may then be added to the ExploitableServices data structure unless an entry corresponding to an IP address and port pair already exists therein (i.e., additional exploits on the same IP address and port pair may be filtered because the exploitable service analysis performed in operation 400 focuses on tracking what ports are exploitable rather than every potential exploit issue). Furthermore, in one implementation, any exploitable services vulnerable to remote or uncredentialed checks may be compared to the predefined service vulnerabilities listed in the configuration file to determine whether or not certain exploitable services should be ignored. For example, in one implementation, the configuration file may specify that services on port 0, port 139, and port 445 should be ignored to avoid vulnerabilities relating to UNIX local checks, Windows local checks, Windows file sharing, or other service vulnerabilities. Alternatively, in one implementation, operation 430 may perform multiple separate queries to avoid identifying services that should be ignored. For example, in order to avoid identifying exploitable services on ports 0, 130, and 445, a first query may identify exploitable vulnerabilities occurring in a range between port 1 and port 138, a second query may identify exploitable vulnerabilities in a range between port 140 and port 144, and a third query may identify exploitable vulnerabilities on any port greater than 445.

In one implementation, an additional query performed in operation 430 may identify any remotely exploitable patch audits, which may include results from various UNIX local checks on port 0 and/or Windows checks written to ports 139 or 445. Accordingly, the query used to identify the remotely exploitable patch audits may scan various hosts in the network to identify which hosts permit "active" checks that can exploit port 0, port 139, and/or port 445. However, the results obtained in the query that identifies the remotely exploitable patch audits may not differentiate between a certain host having a client vulnerable to active checks or a service vulnerable to active checks (e.g., an SSH client versus an SSH service). As such, in one implementation, a filter may be used to identify results from the exploitable patch audit query that match a CVSS string that represents a low access complexity rating (i.e., "AC:L"), wherein the low access complexity rating may be used to indicate remote network attacks (e.g., buffer overflow in Telnet). In one implementation, each remotely exploitable patch audit vulnerability may then be compared against the existing entries in the ExploitableServices data structure, wherein any remotely exploitable patch audit vulnerabilities that do not have a corresponding entry may be added to the ExploitableServices data structure. Furthermore, the remotely exploitable patch audit entries added to the ExploitableServices data structure may be based on a hash between the IP address associated with the host having the vulnerability and port 0. In particular, the patch audit vulnerabilities may be associated with port 0 such that when open ports are subsequently correlated, an assumption can be made regarding exploitable services running on unknown ports (e.g., because data directed to port 0 essentially asks the operating system to assign an available non-zero port that can suitably process the data).

In one implementation, an operation 440 may then walk the IP address and port pairs that accept external connections, which may have been identified in operation 420 and listed in the InternetRemotePorts data structure, in comparison to entries in the ExploitableServices data structure created in operation 430. In particular, operation 440 may select a particular IP address and port pair in the InternetRemotePorts data structure and an operation 450 may then determine whether a corresponding entry exists in the ExploitableServices data structure. In one implementation, if the IP address and port pair selected from the InternetRemotePorts data structure has a corresponding entry exists in the ExploitableServices data structure, the port and additional information describing the exploitable vulnerability corresponding to the selected IP address and port pair may be added to the InternetRemoteExploitIPs data structure that was initially created in operation 410. Furthermore, if the port to be added to the InternetRemoteExploitIPs data structure relates to an exploitable vulnerability on port 0, the port may be assigned an appropriate name in the InternetRemoteExploitIPs data structure to indicate a potential correlation (e.g., "patch-audit"). In one implementation, in response to suitably adding the entry to the InternetRemoteExploitIPs data structure in operation 460, or alternatively in response to operation 450 determining that the current IP address and port pair selected from the InternetRemotePorts data structure lacks a corresponding entry in the ExploitableServices data structure, a subsequent operation 470 may determine whether the InternetRemotePorts data structure includes additional entries to process. As such, operations 440 through 470 may be iteratively performed until all entries in the InternetRemotePorts data structure have been processed and either discarded or added to the InternetRemoteExploitIPs data structure. In one implementation, in response to suitably processing all entries in the InternetRemotePorts data structure, an operation 480 may then generate a report to describe the hosts having remotely exploitable services. For example, in one implementation, operation 480 may generate a report corresponding to each IP address in the InternetRemoteExploitIPs data structure, with an exemplary report that may be generated in operation 480 shown below:

TABLE 2

Exemplary Remotely Exploitable Services Report

Name: Exploitable services that have visibility from remote networks
Family: Gain a shell remotely
Synopsis: The host has one or more exploitable services facing remote networks TABLE 2-continued Exemplary Remotely Exploitable Services Report Description: The following ports have an exploitable vulnerability that can be reached from remote networks.
Port: 22
Description: Exploitable services that have visibility from remote networks.
Port: 80
Description: Apache HTTP Server Byte Range DoS
Port: patch-audit
Description: Oracle Java SE Multiple Vulnerabilities (February 2011 CPU)
Recommendation: These systems should be inspected for compromise, patched to avoid remote exploitation, protected by an Intrusion Prevention System, or otherwise have the listed vulnerabilities mitigated.

Figure 5:
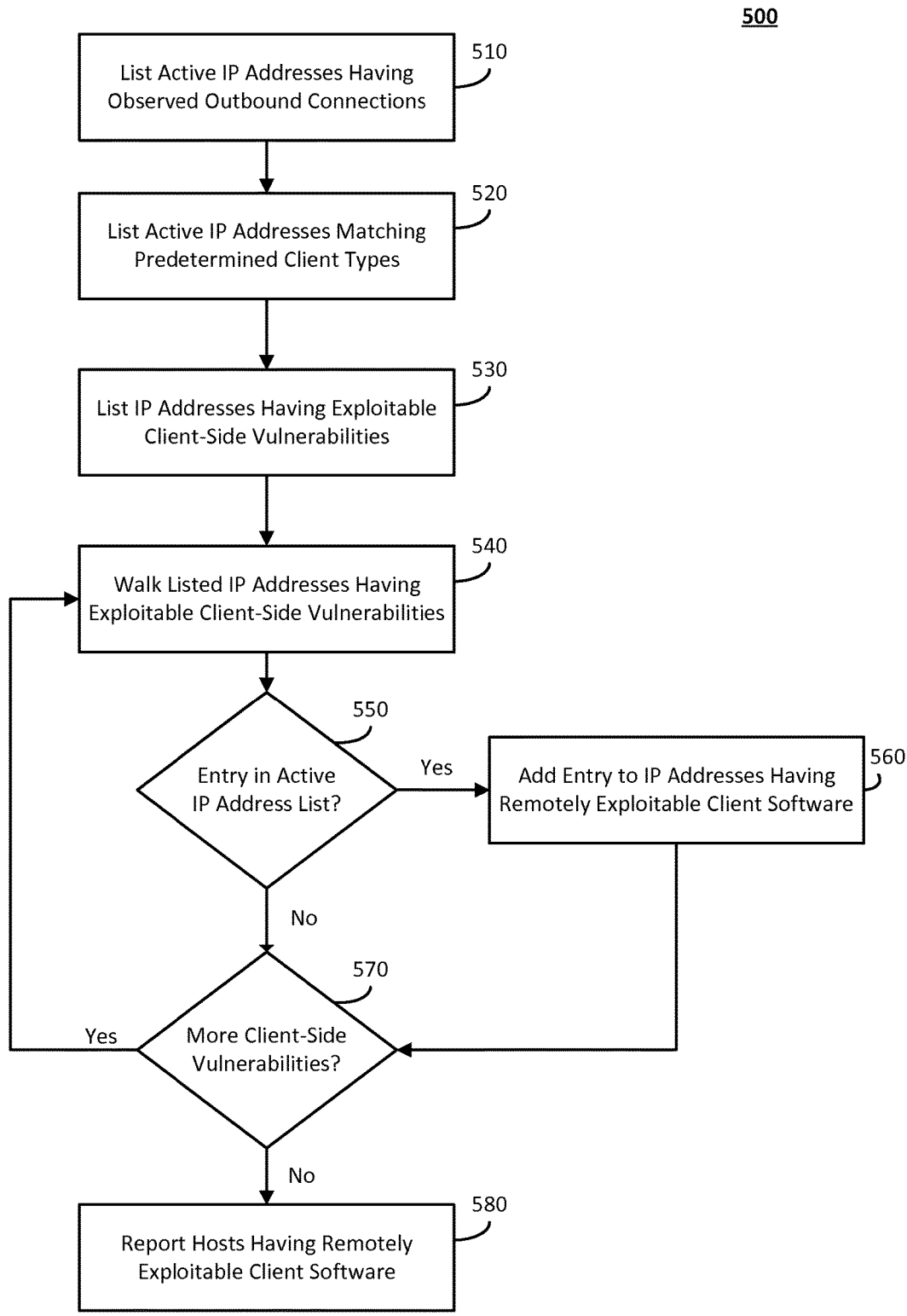
FIG. 5 illustrates an exemplary method to identify network hosts that have exploitable client-side software and connect to remote networks, according to one aspect of the invention.

According to one aspect of the invention, FIG. 5 illustrates an exemplary method 500 to identify network hosts that have exploitable client-side software and connect to remote networks. In particular, the method 500 may generally be performed in connection with operation 340 in FIG. 3 to identify one or more hosts in the network that connect to remote networks and have exploitable client software. For example, in one implementation, the one or more passive scanners may observe traffic in the network to identify certain internal hosts or other devices within the network that connect to or otherwise access remote networks and have exploitable vulnerabilities.

Accordingly, in one implementation, the method 500 shown in FIG. 5 may include an operation 510 in which the one or more passive scanners may observe the activity in the network to track trust relationships between different IP addresses. For example, if a first host having IP address 192.168.1.20 connected to a second host having IP address 192.168.1.24 over SSH on port 22, the passive scanners may store a string or other record in a suitable repository to describe a trust relationship between the hosts (e.g., "192.168.1.20→192.168.1.24:22"). Accordingly, the trust relationships tracked in operation 510 may generally describe the TCP port that was used in connections that the passive scanners observed in the network but may not necessarily represent the actual application used therein. Furthermore, in one implementation, operation 510 may include one or more queries against the records that describe the trust relationships tracked with the passive scanners to identify observed outbound connections among the various tracked trust relationships. For example, the destination address "0.0.0.0" may generally represent connections to the Internet or other remote networks, whereby the queries to identify the observed outbound connections may include a filter to identify connections from devices within the network to external hosts having IP address "0.0.0.0" (e.g., if host 192.168.1.20 visited various websites (or even one website) on port 80, the trust relationships associated with that host and port would contain the text "192.168.1.20→0.0.0.0:80").

In one implementation, any hosts associated with connection records to destination IP address 0.0.0.0 may therefore be known to have participated in observed connections to an IP address outside an area observed with the passive scanners (e.g., where the passive scanners observe traffic within the network, any connection records to destination IP address 0.0.0.0 may be known to reach outside the network). As such, in one implementation, operation 510 may identify all IP addresses associated with internal hosts that connect to the Internet or other remote networks, or alternatively a further filter may be used to produce a more detailed list to only identify IP addresses that are connected to the Internet or other remote networks on certain common ports (e.g., 21, 222, 25, 80, 443, 465, etc.) or based on other suitable criteria (e.g., regular expression matching). In any case, operation 510 may then create one or more records in an ActiveClientIPs data structure to list hashes that correspond to each active IP address associated with an observed outbound connection having interest to the analysis. For example, the records created in the ActiveClientIPs data structure may include all IP addresses that are connected to remote networks, only those IP addresses that are connected to remote networks on certain ports, and so on.

In one implementation, an operation 520 may then identify one or more active IP addresses that use certain predetermined client types or otherwise match certain criteria relating to specific client types that may be susceptible to malicious content. In particular, the passive scanners may have capabilities to identify specific Internet activities or services (e.g., Skype, YouTube, Pandora, Facebook, Netflix, etc.), which may be leveraged in operation 520 to list IP addresses that perform certain Internet activities, access certain Internet services, have certain client types, or match other suitable criteria. For example, in one implementation, operation 520 may include querying information that describes network activity observed with the passive scanners to identify IP addresses that may be associated with mobile devices (e.g., smartphones and tablets), Simple Mail Transfer Protocol (SMTP) clients, Internet Relay Chat (IRC) clients, and instant messenger clients (e.g., AIM, Yahoo Messenger, ICQ, etc.). In one implementation, each IP address associated with a mobile device, SMTP client, IRC client, instant messenger client, or other suitable client type may be assumed to handle content from remote networks typically delivered through a proxy or mail gateway, wherein operation 520 may deliberately filter out web traffic and web browsers from the client types queried therein because IP addresses participating in outbound connections associated therewith would have been listed in operation 510. On the other hand, SMTP, IRC, instant messenger, and various other protocols can all be victim to malicious content served through proxied connections that would not have been listed in operation 510. Accordingly, each IP address identified in operation 520 may then be listed in the ActiveClientIPs data structure (to the extent that corresponding entries do not already exist therein).

In one implementation, an operation 530 may then list one or more IP addresses having exploitable client-side vulnerabilities in order to correlate Internet browsing with client-side attacks distinctly from all possible network vulnerabilities. For example, two different systems may both have vulnerable web browsers, but if one never accesses the Internet while the other regularly does so, the one accessing the Internet may pose a substantially greater exploitation risk in the network. In another example, because operation 530 focuses on identifying systems that access the Internet or other remote networks with insecure clients, the queries performed therein may be designed to avoid generating warnings about an insecure internal web server that only accesses the Internet with a secure FTP client (even though the insecure web server poses a security issue). Accordingly, in one implementation, operation 530 may include one or more queries to identify IP addresses associated with exploitable or questionably secure client software. For example, in one implementation, the queries performed in operation 530 may identify IP addresses associated with passive systems that have exploitable or vulnerable clients on port 0 (e.g., all client-side vulnerabilities on port 0 that have a publicly available exploit or a CVSS score greater than a certain threshold, wherein using the CVSS score may identify highly vulnerable client software that does not have a publicly available exploit). In one implementation, identifying the exploitable or vulnerable clients on port 0 may identify various client-side exploit issues in email, web browsers, SSH tools (e.g., putty), and scriptable tools (e.g., wget), among others. For example, if a server relies on wget to access content on remote networks, a missing wget patch could provide an attack vector that can be exploited in an automated scenario (e.g., compromising the server and providing malicious content to be downloaded and processed using wget).

In one implementation, one or more additional queries may be performed in operation 530 to identify unsupported software and further to identify remotely exploitable patch audits. For example, operation 530 may identify one or more systems that have unsupported server or client software and browse the Internet or other remote networks, wherein the identified systems that have unsupported server or client software may likely be unmanaged and therefore present an easy exploitation risk. Furthermore, to identify the remotely exploitable patch audits, which may include results from various UNIX local checks on port 0 and/or Windows checks written to ports 139 or 445, operation 530 may scan various hosts in the network to identify which hosts permit "active" checks that can exploit port 0, port 139, and/or port 445. In one implementation, to differentiate whether the hosts that permit the active checks have clients or services vulnerable thereto, operation 530 may use a filter to identify results from the exploitable patch audit query that match a CVSS string that represents a medium or high access complexity rating (i.e., "AC:M" or "AC:H"), wherein the medium and high access complexity ratings may be used to indicate client-side issues that may be vulnerable to remote network attacks. In one implementation, each IP address identified in operation 530, including those associated with passive systems that have exploitable or vulnerable clients on port 0, those that have unsupported software vulnerabilities, and those that have remotely exploitable patch audit vulnerabilities, may then be listed in an ExploitableClientIPs data structure (to the extent that corresponding entries do not already exist therein).

In one implementation, an operation 540 may then walk the IP addresses listed in the ExploitableClientIPs data structure in comparison to entries in the ActiveClientIPs data structure. In particular, operation 540 may select an IP address from the ExploitableClientIPs data structure and an operation 550 may then determine whether a corresponding entry exists in the ActiveClientIPs data structure. In one implementation, if the IP address selected from the ExploitableClientIPs data structure has a corresponding entry exists in the ActiveClientIPs data structure, the selected IP address and additional information to describe the exploitable client-side vulnerability corresponding thereto may be added to an InternetClientExploitIPs data structure in an operation 560, wherein the InternetClientExploitIPs data structure may list all internal IP addresses in the network that have exploitable clients and browse the Internet or otherwise process content from remote networks. In one implementation, in response to suitably adding the entry to the InternetClientExploitIPs data structure in operation 560, or alternatively in response to operation 550 determining that the current IP address selected from the ExploitableClientIPs data structure lacks a corresponding entry in the ActiveClientIPs data structure, a subsequent operation 570 may determine whether the ExploitableClientIPs data structure includes additional entries to process. As such, operations 540 through 570 may be iteratively performed until all entries in the ExploitableClientIPs data structure have been processed and either discarded or added to the InternetClientExploitIPs data structure. In one implementation, in response to suitably processing all entries in the ExploitableClientIPs data structure, an operation 580 may then generate a report to describe the hosts having remotely exploitable client software. For example, in one implementation, operation 580 may generate a report corresponding to each IP address in the InternetClientExploitIPs data structure, with an exemplary report that may be generated in operation 580 shown below:

TABLE 3

Exemplary Remotely Exploitable Client Software Report

Name: Hosts that connect to remote networks and have exploitable client software
Family: Gain a shell remotely
Synopsis: The host has one or more exploitable client software packages and was identified to access remote networks or remote network content directly
Description: The following client-side vulnerabilities are easily exploited. Because this host has been observed to access remote networks directly, the host is at risk to being exploited with any of these vulnerabilities.
Client: Safari < 5.1.1 (Multiple Vulnerabilities)
Client: Safari < 5.1 (Multiple Vulnerabilities)
Client: Safari < 4.0 (Multiple Vulnerabilities)
Description: The host has installed the Safari web browser, which may be vulnerable to multiple attack vectors. For your information, the observed version of Safari is earlier than 4.0. Safari versions earlier than 5.1.1 are potentially affected by several issues.
Client: VLC Media Player < 1.1.7 (Code Execution Vulnerability)
Description: The host contains VLC player, a multimedia application that allows arbitrary code execution. For your information, the observed VLC version is earlier than 1.1.7. VLC versions earlier than 1.1.7 are potentially affected by a code execution vulnerability due to insufficient input validation when parsing a specially crafted Matroska or WebM (MKV) file.
Recommendation: The host should be upgraded to Safari 5.1.1 or later, upgraded to VLC player version 1.1.7 or later, inspected for compromise, patched to avoid remote exploitation, protected by an Intrusion Prevention System, or otherwise have the listed vulnerabilities mitigated.

Figure 6:
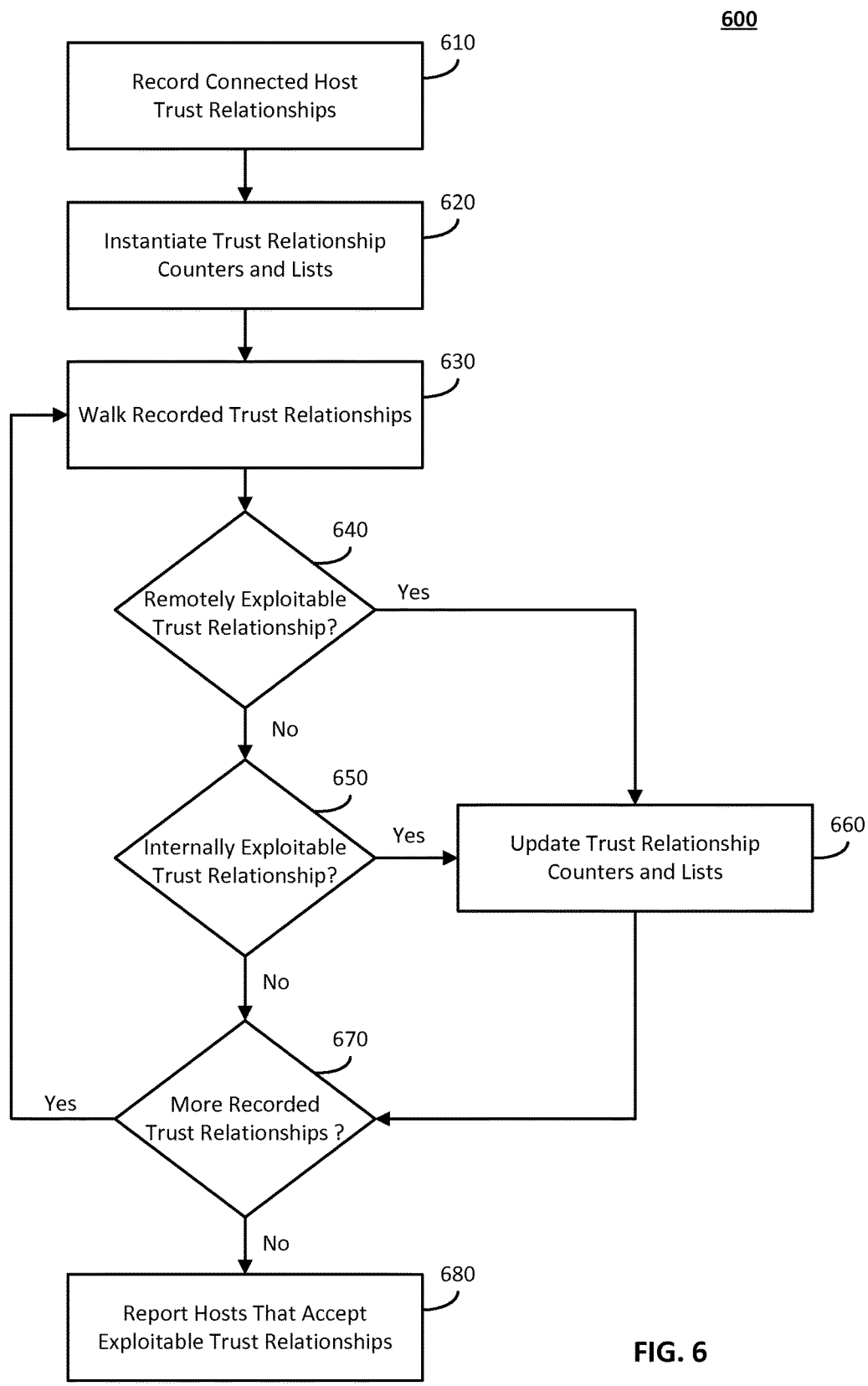
FIG. 6 illustrates an exemplary method to identify network hosts that accept trust relationships from internal hosts having exploitable vulnerabilities that could be used in a direct network attack or a client-side exploit, according to one aspect of the invention.

According to one aspect of the invention, FIG. 6 illustrates an exemplary method 600 to identify network hosts that accept trust relationships from internal hosts having exploitable vulnerabilities that could be used in a direct network attack or a client-side exploit. In one implementation, the method 600 shown in FIG. 6 may use various data structures created using the techniques described in further detail above, including the InternetRemoteExploitIPs data structure that lists all IP addresses with exploitable vulnerabilities visible from remote networks, the ExploitableServices data structure that lists all internal IP addresses that have exploitable services, the ExploitableClientIPs data structure that lists all internal IP addresses that have exploitable client-side vulnerabilities, and the InternetClientExploitIPs data structure that lists all internal IP addresses that have exploitable client-side vulnerabilities and browse the Internet or otherwise process content from remote networks.

In one implementation, the method 600 shown in FIG. 6 may include an operation 610 to record one or more connected hosts that accept trust relationships from internal hosts and/or remote hosts that have exploitable vulnerabilities. In particular, operation 610 may include the one or more passive scanners observing activity in the network to track trust relationships between different IP addresses in a generally similar manner to that described above with respect to operation 510 in FIG. 5. For example, in response to observing the network activity in which a client having IP address 192.168.1.20 connected to a server having IP address 192.168.1.24 on port 22, the passive scanners may record the port and the IP addresses associated with the client that are connected to the server to describe a trust relationship therebetween (e.g., "192.168.1.20→192.168.1.24:22"). Accordingly, in one implementation, operation 610 may analyze all trust relationships that the passive scanners recorded based on activity observed in the network and filter out any trust relationships that specify a "0.0.0.0" destination address in order to ignore connections to the Internet or other remote networks (i.e., because the method 600 focuses on identifying trusted clients on the local network). Additionally, in one implementation, operation 610 may further filter out any trust relationships that relate to certain hosts, IP addresses, or ports (e.g., based on predefined filtering criteria specified in the configuration file). Alternatively, in one implementation, operation 610 may use various filters to identify specific trust relationships on the local network (e.g., only identifying clients on the internal network that connect to a host having a specific IP address or an IP addresses within a specific range, only identifying internal connections to one or more particular ports, etc.).

In one implementation, in response to suitably identifying the trust relationships that relate to internal connections in the network, operation 610 may then build one or more hash trees to list all internal servers and internal clients associated with trust relationships that were observed in the network. For example, in one implementation, the one or more hash trees may include a ConnectedServers data structure that lists an IP address associated with each unique "server" that the passive scanners have observed a "connection to," a SourceClients data structure that lists an IP address associated with each unique "client" that the passive scanners have observed a "connection from," and a TrustPairs data structure that lists hashes based on concatenations between the IP addresses associated with each unique "client-server" connection that the passive scanners observed. As such, the ConnectedServers, SourceClients, and TrustPairs data structures may generally reduce the connectivity types associated with the tracked trust relationships to the IP layer and drop redundant records that relate to multiple port connections between the same two hosts. Alternatively, in one implementation, the IP addresses listed in the SourceClients data structure may be concatenated and stored within the ConnectedServers data structure to reduce the number of data structures and/or provide an easy reference point to identify client systems that connect to the servers listed in the ConnectedServers data structure.

In one implementation, an operation 620 may then instantiate various counters and lists to track the trust relationships associated with each IP address listed in the ConnectedServers data structure. For example, in one implementation, the counters instantiated in operation 620 may track (for each IP address listed in the ConnectedServers data structure) a number of connections to the IP address from remotely exploitable servers, a number of connections to the IP address from internally exploitable servers, a number of connections to the IP address from remotely exploitable clients, and a number of connections to the IP address from internally exploitable clients. Similarly, for each IP address listed in the ConnectedServers data structure, the lists instantiated in operation 620 may track the connections to the IP address from the remotely exploitable servers, the internally exploitable servers, the remotely exploitable clients, and the internally exploitable clients.

In one implementation, the recorded trust relationships associated with each IP address listed in the ConnectedServers data structure may then be walked in an operation 630 to determine whether the recorded trust relationships could be used to compromise the network in a direct attack and/or a client-side exploit. For example, in one implementation, operation 630 may select a particular IP address from the ConnectedServers data structure and read the listed client IP addresses having recorded trust relationships with the selected IP address from one or more of the ConnectedServers, SourceClients, or TrustPairs data structures. In one implementation, an operation 640 may then determine whether the client IP addresses that have recorded trust relationships with the IP address selected from the ConnectedServers data structure have a corresponding entry in either the InternetRemoteExploitIPs data structure or the ExploitableClientIPs data structure. In one implementation, an operation 660 may then add any client IP addresses that correspond to an entry in the InternetRemoteExploitIPs data structure to the list that was instantiated to track the connections from remotely exploitable servers and increment the corresponding counter, and operation 660 may further add any client IP addresses that correspond to an entry in the ExploitableClientIPs data structure to the list that was instantiated to track the connections from remotely exploitable clients (in addition to incrementing the corresponding counter). Furthermore, any client IP addresses that have recorded trust relationships with the selected IP address may be compared to the ExploitableServices data structure and the InternetClientExploitIPs data structure in an operation 650, wherein operation 660 may add any client IP addresses that correspond to an entry in the ExploitableServices data structure to the list that was instantiated to track the connections from internally exploitable servers and any client IP addresses that correspond to an entry in the InternetClientExploitIPs data structure to the list that was instantiated to track the connections from internally exploitable clients (and increment the corresponding counters).

Accordingly, operation 640 may generally be performed prior to operation 650 to avoid considering internal exploitation associated with any client IP addresses that correspond to remotely exploitable servers or clients (i.e., because such client IP addresses would be counted twice and a remotely exploitable may be assumed to also be internally exploitable). In one implementation, in response to suitably updating the trust relationship counters and lists in operation 660, or alternatively in response to operations 640 and 650 determining that the current IP address selected from the ConnectedServers data structure lack any remotely or internally exploitable trust relationships, an operation 670 may then determine whether the ConnectedServers data structure includes additional IP addresses to process. As such, operations 630 through 670 may be iteratively performed until all IP addresses in the ConnectedServers data structure have been processed to update the corresponding trust relationship counters and lists. In one implementation, in response to suitably processing all IP addresses in the ConnectedServers data structure, an operation 680 may then generate a report to describe the hosts having exploitable trust relationships. For example, in response to walking all the client IP addresses having trust relationships with the server IP addresses listed in the ConnectedServers data structure, operation 680 may generate a report corresponding to each server IP address in the ConnectedServers data structure that has one or more non-zero counters (i.e., each server IP address that accepts trust relationships from one or more remotely exploitable servers, remotely exploitable clients, internally exploitable servers, and/or internally exploitable clients). In one implementation, an exemplary report that may be generated in operation 680 may have the format shown below:

TABLE 4

Exemplary Exploitable Trust Relationship Report

Name: Hosts that accept trust relationships from systems having exploitable vulnerabilities
Family: Gain a shell remotely
Synopsis: The host corresponds to a server that accepts connections from exploitable clients
Description: The following lists identify clients that connect to the host and
(1) have services that can be directly exploited from remote networks, (2) have services that can be exploited internally, (3) connect to remote networks and have exploitable client-side vulnerabilities, and/or (4) have exploitable client-side software despite not having been observed to connect to remote networks.
Clients with Exploitable Internet Services:
192.168.1.1
192.168.1.2
192.168.1.200
192.168.1.20
Clients with Internally Exploitable Services:
None
Internet Clients with Exploitable Client Software:
172.10.20.220
172.10.20.120
172.10.20.12
172.10.20.22
Non-Internet Browsing Clients with Exploitable Client Software:
None
Recommendation: This information should be used to perform a risk analysis in your network and ideally mitigate all listed vulnerabilities. Otherwise, in lieu of mitigating all listed vulnerabilities, this information can be used to prioritize which systems should be patched first.

Figure 7:
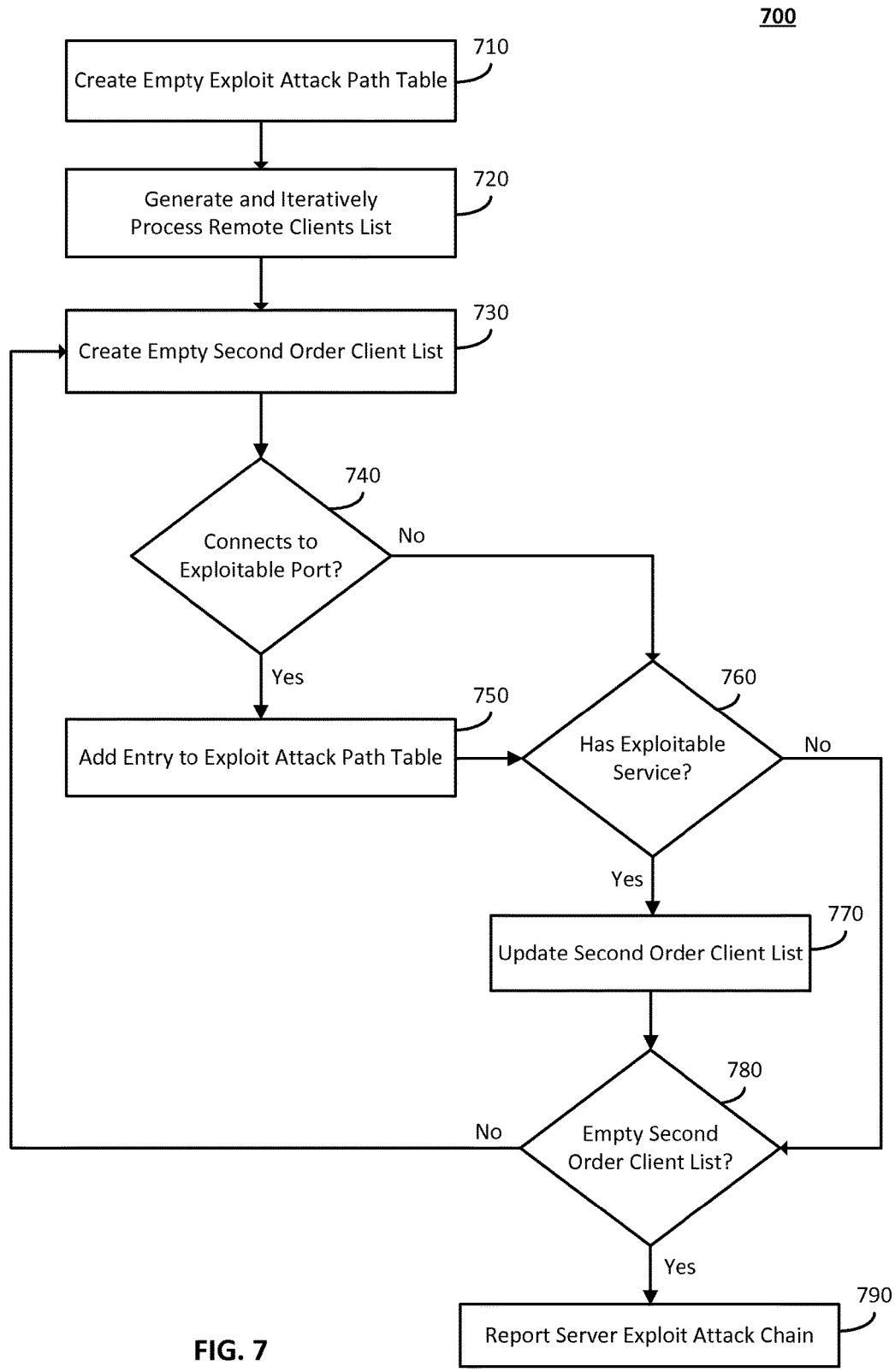
FIG. 7 illustrates an exemplary method to simulate attack paths that may potentially exploit identified weak points in a network, according to one aspect of the invention.

According to one aspect of the invention, FIG. 7 illustrates an exemplary method 700 to simulate attack paths that may potentially exploit identified weak points in a network. In particular, the method 700 may generally be performed in connection with operation 360 in FIG. 3 to simulate an exploit attack chain associated with each potentially exploitable server identified in the network based on known trust relationships associated therewith. For example, the method 700 may be performed to simulate the attack path associated with a particular exploitable server and appropriately repeated to simulate attack paths associated with any other exploitable servers that may have been identified in the network. In one implementation, as will be described in further detail herein, the method 700 may generally model the known trust relationships associated with the particular server in a tree to represent available access control paths, attempt to simulate hacking via server-side exploitation to enumerate all remote IP addresses that could potentially exploit that server via one or more "hops," and continue to expand the tree until all client IP addresses having vulnerabilities that could be remotely or internally exploited have been suitably processed.

In one implementation, the method 700 shown in FIG. 7 may include an operation 710 in which an empty exploit attack path table may be created to track client IP addresses that can hack into or otherwise use an available control path to access a particular host IP address listed in the previously created ExploitableServices data structure, which lists all internal hosts that have an exploitable vulnerability on a particular port. In one implementation, subsequent operations may populate the empty exploit attack path table, which may be called ExploitPaths, with the client IP addresses that can hack into or otherwise use an available access control path to attack the host IP address currently selected from the ExploitableServices data structure and information that describes the access control path that the client IP addresses could use accomplish the attack against the currently selected host IP address. In one implementation, an operation 720 may then generate and iteratively process all remote clients associated with the currently selected host IP address, which may be identified from the trust relationships modeled in the ConnectedServers, SourceClients, and/or TrustPairs data structures. Furthermore, in one implementation, certain additional trust relationships may be modeled in operation 720 to further identify the remote clients associated with the currently selected host. For example, many trust relationships may be considered valid connections despite not being privileged connections, whereby the trust relationships modeled in operation 720 may be used to identify particular servers or hosts that could be "hacked through" via a leapfrogging chain (e.g., if an administrator knows that Exchange has a vulnerability to a remote exploit or uses an exploitable port, modeling how an Outlook email client connects to Exchange may be useful to understanding the connections that can be used to access certain servers).

In one implementation, operation 720 may select a particular remote client from the remote clients that have trust relationships with the currently selected host, wherein a subsequent operation 730 may then create an empty SecondOrderClients data structure associated with the remote client selected in operation 720. In one implementation, an operation 740 may then determine whether the remote client connects to the host on an exploitable port, in which case an entry corresponding to the remote client may be added to the ExploitPaths table in an operation 750. For example, in one implementation, the entry added to the ExploitPaths table may describe the exploit, trust relationship, or other control path used to access the host on the exploitable port.

In one implementation, an operation 760 may then determine whether the current remote client has exploitable services, in which case an operation 770 may update the SecondOrderClients data structure associated with the remote client. For example, in response to determining that the current remote client has exploitable services, operation 770 may update the SecondOrderClients data structure to list all additional (i.e., second order) clients that connect to the remote client and do not have corresponding entries in either the ExploitableServices data structure or the ExploitPaths table. In particular, operation 770 may omit any second order clients from the SecondOrderClients data structure that correspond to entries in the ExploitableServices data structure or the ExploitPaths table because the method 700 may be performed to process entries in the ExploitableServices data structure and the iterative processing performed in operations 730 through 780 will reach all corresponding entries in the ExploitPaths table. In one implementation, updating the SecondOrderClients data structure in operation 770 may further describe the exploitation path from the second order clients to the current remote client, which may be used to further expand the tree representing available access control paths to the current host and prevent the tree from having any loops. In one implementation, in response to suitably processing the current remote host to determine whether to add a corresponding entry to the ExploitPaths table and/or update the SecondOrderClients data structure associated therewith, an operation 780 may cause the method to return to operation 730 in response to determining that the SecondOrderClients data structure has one or more entries. In particular, operations 730 through 780 may be iteratively performed until the current remote client has (and/or the second order remote client) has an empty SecondOrderClients data structure, meaning that the tree describing the exploit attack chain associated with the current host has been fully enumerated with all remote IP addresses that could potentially exploit the host.

In one implementation, in response to operation 780 determining that the current remote client (or second order remote client) has an empty SecondOrderClients data structure, a report may then be generated in operation 790 to list the attack paths associated with the currently selected host, wherein the report may list the attack paths in an order from highest to lowest severity based on a type associated with the remote client IP addresses that could potentially exploit the host (i.e., IP addresses that can be exploited remotely may have a higher severity in the report than internal IP addresses that have no vulnerabilities). In one implementation, the attack paths listed in the report may include a critical severity level to represent exploits from remotely visible servers, a high severity level to represent exploits from remotely visible clients that process content from remote networks, and a medium severity level to represent compromise internal to the network. For example, the report generated in operation 790 may have the format shown below to represent the attack paths associated with a particular host in the network:

TABLE 5

Exemplary Server Exploit Attack Chain Report

Name: Server exploit attack chain analysis
Family: Gain a shell remotely
Synopsis: The host has services that can be easily exploited from trusted clients
Description: The following lists identify attack paths that can compromise the host from internal IP networks, addresses, which are grouped into systems known to have exploitable services facing remote exploitable clients that access the Internet or otherwise process content from remote networks, internal servers that can be exploited, local systems that have exploitable client software, and systems with no known exploits.
Clients with Exploitable Internet Services:
192.168.1.1 can compromise 100.100.100.100 in 2 steps:
192.168.1.1 --> MySQL Community Server (Multiple Vulnerabilities) --> 200.200.232.223:3306
200.200.232.223 --> Apache (Multiple Vulnerabilities) --> 100.100.100.100:80
Clients with Internally Exploitable Services:
None
Internet Clients with Exploitable Client Software:
172.10.20.220 can compromise 100.100.100.100 in 4 steps:
172.10.20.220 --> libNSS Hello Challenge Remote Heap Overflow --> 172.10.20.200:9999
172.10.20.200 --> libNSS Hello Challenge Remote Heap Overflow -> 172.10.20.250:9999
172.10.20.250 --> Microsoft SQL Server Could Allow Remote Code Execution --> 172.10.20.33:80
172.10.20.33 --> Samba 3.x SMB1 Packet Chaining Memory Corruption --> 100.100.100.100:445
Non-Internet Browsing Clients with Exploitable Client Software:
None
Internal Clients with No Known Exploits:
None
Recommendation: This information should be used to perform a risk analysis in your network and ideally mitigate all listed vulnerabilities. Otherwise, in lieu of mitigating all listed vulnerabilities, this information can be used to prioritize which systems should be patched first.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence, and to the extent that the above disclosure describes certain exemplary aspects or implementations using singular forms (e.g., "a," "an," "the," etc.), such singular forms will be understood to further include plural forms unless clearly indicated otherwise. Those skilled in the pertinent art will further appreciate that the terms "comprises," "comprising," "includes," and/or "including" specify that the features, structures, or characteristics are present in the associated aspects and implementations but do not preclude the one or more other features, structures, or characteristics from being present or added to the associated aspects and implementations.

Furthermore, aspects and implementations may be described in the above disclosure as including particular features, structures, or characteristics, but it will be apparent that every aspect or implementation may or may not necessarily include the particular features, structures, or characteristics, and moreover, well-known features, structures, or characteristics associated with the aspects and implementations described above may be described in general terms or omitted to avoid obscuring the relevant details associated with the aspects and implementations described above. Further, where particular features, structures, or characteristics have been described in connection with a specific aspect or implementation, it will be understood that such features, structures, or characteristics may be included with other aspects or implementations, whether or not explicitly described. In addition, alternate aspects and implementations may be apparent to those skilled in the pertinent art based on the above disclosure, wherein such alternate aspects and implementations may be constructed and practiced without departing from the scope or spirit of the invention. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for predicting attack paths in a network, comprising:
one or more scanners configured to determine one or more network addresses and one or more open ports associated with one or more connections in the network; and
one or more hardware processors coupled to the one or more scanners, wherein the one or more hardware processors are configured to:
identify, in the network, at least one host that has an exploitable vulnerability based on the one or more network addresses and the one or more open ports associated with the one or more network connections;
model one or more trust relationships accepted at the at least one host based on the one or more network addresses and the one or more open ports associated with the one or more network connections, wherein the one or more trust relationships accepted at the at least one host provide an available access control path to the exploitable vulnerability on the at least one host;
simulate an attack against the at least one host, the simulated attack used to determine one or more network addresses that could use the one or more trust relationships accepted at the at least one host to reach the exploitable vulnerability on the at least one host; and
determine that the one or more network addresses could be used to compromise the at least one host based at least in part on the one or more network addresses corresponding to one or more remote clients that have one or more exploitable weak points.

2. The system recited in claim 1, wherein the one or more hardware processors are further configured to:
identify, among the one or more network addresses and the one or more open ports associated with the one or more network connections, at least one network address that permits external access on one or more predetermined ports; and
determine that the at least one network address corresponds to a host that has a remotely exploitable service based on the permitted external access on the one or more predetermined ports, wherein the one or more exploitable weak points include at least the remotely exploitable service associated with the at least one network address.

3. The system recited in claim 1, wherein the one or more hardware processors are further configured to:
identify, among the one or more network addresses and the one or more open ports associated with the one or more network connections, at least one network address having one or more an exploitable service that permits remote or uncredentialed checks, an exploitable service on one or more predetermined ports, or a remotely exploitable patch audit associated with a low access complexity rating; and
determine that the at least one network address corresponds to a host that has an internally exploitable service, wherein the one or more exploitable weak points include at least the internally exploitable service associated with the at least one network address.

4. The system recited in claim 1, wherein the one or more hardware processors are further configured to:
identify, among the one or more network addresses and the one or more open ports associated with the one or more network connections, at least one network address paired with one or more open ports that accept external connections; and
determine that a host corresponding to the at least one network address has a remotely exploitable service in response to the host further having an internally exploitable service, wherein the one or more exploitable weak points include at least the internally exploitable service and the remotely exploitable service associated with the at least one network address.

5. The system recited in claim 1, wherein the one or more hardware processors are further configured to:
identify, among the one or more network addresses and the one or more open ports associated with the one or more network connections, at least one network address having one or more exploitable services on port zero; and
determine that the at least one network address corresponds to a host that has exploitable client software based on the one or more exploitable services on port zero, wherein the one or more exploitable weak points include at least the exploitable client software associated with the at least one network address.

6. The system recited in claim 1, wherein the one or more hardware processors are further configured to:
identify, among the one or more network addresses and the one or more open ports associated with the one or more network connections, at least one network address having one or more remotely exploitable patch audits associated with one or more of a medium access complexity rating or a high access complexity rating; and
determine that the at least one network address corresponds to a host that has exploitable client software based on the one or more remotely exploitable patch audits associated with one or more of the medium or high access complexity rating, wherein the one or more exploitable weak points include at least the exploitable client software associated with the at least one network address.

7. The system recited in claim 6, wherein the one or more hardware processors are further configured to:
identify, among the one or more network addresses and the one or more open ports associated with the one or more network connections, at least one network address that corresponds to one or more of a mobile device, a host that connects to a destination external to the network, or a host that uses one or more proxy or mail gateway protocols;
determine, based on the one or more network connections, that the at least one network address has one or more of an exploitable service on port zero or a remotely exploitable patch audit associated with a medium or high access complexity rating; and
determine that the host corresponding to the at least one network address has exploitable client software and connects to or processes content from one or more remote networks, wherein the one or more exploitable weak points include at least the exploitable client software on the host that connects to or processes content from the one or more remote networks.

8. The system recited in claim 1, wherein the one or more hardware processors are further configured to identify, among the one or more network connections, at least one internal connection from a source host in the network to a destination host in the network, wherein the modeled one or more trust relationships associate a network address corresponding to the destination host with a network address corresponding to the source host based on the at least one internal connection.

9. The system recited in claim 8, wherein the one or more hardware processors are further configured to determine that the destination host accepts an exploitable trust relationship from a remotely exploitable source host in response to the source host having a remotely exploitable service, wherein the one or more exploitable weak points include at least the exploitable trust relationship that the destination host accepts from the remotely exploitable source host.

10. The system recited in claim 8, wherein the one or more hardware processors are further configured to determine that the destination host accepts an exploitable trust relationship from a remotely exploitable source host in response to the source host having exploitable client software and connecting to or processing content from one or more remote networks, wherein the one or more exploitable weak points include at least the exploitable trust relationship that the destination host accepts from the remotely exploitable source host.

11. The system recited in claim 8, wherein the one or more hardware processors are further configured to determine that the destination host accepts an exploitable trust relationship from an internally exploitable source host in response to the source host having one or more of an internally exploitable service or exploitable client software, wherein the one or more exploitable weak points include at least the exploitable trust relationship that the destination host accepts from the internally exploitable source host.

12. The system recited in claim 1, wherein the one or more hardware processors are further configured to:
select the at least one host associated with the simulated attack based on the host having at least one internally exploitable service, wherein the selected host comprises a destination host associated with at least one internal connection identified in the network;
use the modeled one or more trust relationships to determine one or more network addresses that correspond to one or more source hosts that have connected to a network address associated with the destination host; and
process the one or more network addresses that correspond to the one or more source hosts that have connected to the destination host to determine the one or more network addresses that could be used to compromise the at least one host.

13. The system recited in claim 12, wherein the one or more hardware processors are configured to process the one or more network addresses that correspond to the one or more source hosts that have connected to the destination host via a simulation algorithm that further causes the one or more hardware processors to:
select a current network address among the one or more network addresses that correspond to the one or more source hosts that have connected to the destination host;
determine that the one or more network addresses that could be used to compromise the at least one host include the current network address in response to the source host associated with the current network address connecting to the destination host on an exploitable port, wherein an exploitation path to reach the exploitable vulnerability on the at least one host includes an exploit used to connect the source host to the destination host on the exploitable port;
use the modeled one or more trust relationships to determine one or more second order network addresses that correspond to one or more source hosts that have connected to the current network address in response to the source host associated with the current network address having an internally exploitable service, wherein the one or more second order network addresses exclude any network addresses that are included among the one or more network addresses that could be used to compromise the at least one host and one or more hosts in the network that have one or more internally exploitable services; and execute the simulation algorithm to iteratively process the one or more second order network addresses that correspond to the one or more source hosts that have connected to the current network address until no further second order network addresses are determined.

14. The system recited in claim 13, wherein the simulation algorithm further causes the one or more hardware processors to iteratively process the one or more network addresses that correspond to the one or more source hosts that have connected to the destination host until all source hosts that have connected to the destination host have been processed.

15. The system recited in claim 1, wherein the one or more hardware processors are further configured to generate a report that describes an exploitation path that the one or more network addresses could use to compromise the at least one host based on the simulated attack according to one or more severity levels.

16. The system recited in claim 1, wherein the one or more exploitable weak points include one or more of a network vulnerability having a publicly known exploit associated therewith or a network vulnerability satisfying one or more predetermined criteria associated with a vulnerability scoring system.

17. The system recited in claim 1, further comprising a log aggregator configured to collect one or more events that describe activity in the network, wherein the one or more hardware processors are further configured to model the one or more trust relationships and identify the one or more exploitable weak points in the network based on the one or more events collected at the log aggregator.

18. A method for predicting attack paths in a network, comprising:
configuring one or more scanners to determine one or more network addresses and one or more open ports associated with one or more connections in the network;
identifying, in the network, at least one host that has an exploitable vulnerability based on the one or more network addresses and the one or more open ports associated with the one or more network connections;
modeling one or more trust relationships accepted at the at least one host based on the one or more network addresses and the one or more open ports associated with the one or more network connections, wherein the one or more trust relationships accepted at the at least one host provide an available access control path to the exploitable vulnerability on the at least one host;
simulating an attack against the at least one host, the simulated attack used to determine one or more network addresses that could use the one or more trust relationships accepted at the at least one host to reach the exploitable vulnerability on the at least one host; and
determining that the one or more network addresses could be used to compromise the at least one host based at least in part on the one or more network addresses corresponding to one or more remote clients that have one or more exploitable weak points.

19. The method recited in claim 18, further comprising:
identifying, among the one or more network addresses and the one or more open ports associated with the one or more network connections, at least one network address that permits external access on one or more predetermined ports; and determining that the at least one network address corresponds to a host that has a remotely exploitable service based on the permitted external access on the one or more predetermined ports, wherein the one or more exploitable weak points include at least the remotely exploitable service associated with the at least one network address.

20. The method recited in claim 18, further comprising:
identifying, among the one or more network addresses and the one or more open ports associated with the one or more network connections, at least one network address having one or more an exploitable service that permits remote or uncredentialed checks, an exploitable service on one or more predetermined ports, or a remotely exploitable patch audit associated with a low access complexity rating; and
determining that the at least one network address corresponds to a host that has an internally exploitable service, wherein the one or more exploitable weak points include at least the internally exploitable service associated with the at least one network address.

21. The method recited in claim 18, further comprising:
identifying, among the one or more network addresses and the one or more open ports associated with the one or more network connections, at least one network address paired with one or more open ports that accept external connections; and
determining that a host corresponding to the at least one network address has a remotely exploitable service in response to the host further having an internally exploitable service, wherein the one or more exploitable weak points include at least the internally exploitable service and the remotely exploitable service associated with the at least one network address.

22. The method recited in claim 18, further comprising:
identifying, among the one or more network addresses and the one or more open ports associated with the one or more network connections, at least one network address having one or more exploitable services on port zero; and
determining that the at least one network address corresponds to a host that has exploitable client software based on the one or more exploitable services on port zero, wherein the one or more exploitable weak points include at least the exploitable client software associated with the at least one network address.

23. The method recited in claim 18, further comprising:
identifying, among the one or more network addresses and the one or more open ports associated with the one or more network connections, at least one network address having one or more remotely exploitable patch audits associated with one or more of a medium access complexity rating or a high access complexity rating; and
determining that the at least one network address corresponds to a host that has exploitable client software based on the one or more remotely exploitable patch audits associated with one or more of the medium or high access complexity rating, wherein the one or more exploitable weak points include at least the exploitable client software associated with the at least one network address.

24. The method recited in claim 23, further comprising:
identifying, among the one or more network addresses and the one or more open ports associated with the one or more network connections, at least one network address that corresponds to one or more of a mobile device, a host that connects to a destination external to the network, or a host that uses one or more proxy or mail gateway protocols;

determining, based on the one or more network connections, that the at least one network address has one or more of an exploitable service on port zero or a remotely exploitable patch audit associated with a medium or high access complexity rating; and determining that the host corresponding to the at least one network address has exploitable client software and connects to or processes content from one or more remote networks, wherein the one or more exploitable weak points include at least the exploitable client software on the host that connects to or processes content from the one or more remote networks.

25. The method recited in claim 18, further comprising identifying, among the one or more network connections, at least one internal connection from a source host in the network to a destination host in the network, wherein the modeled one or more trust relationships associate a network address corresponding to the destination host with a network address corresponding to the source host based on the at least one internal connection.

26. The method recited in claim 25, further comprising determining that the destination host accepts an exploitable trust relationship from a remotely exploitable source host in response to the source host having a remotely exploitable service, wherein the one or more exploitable weak points include at least the exploitable trust relationship that the destination host accepts from the remotely exploitable source host.

27. The method recited in claim 25, further comprising determining that the destination host accepts an exploitable trust relationship from a remotely exploitable source host in response to the source host having exploitable client software and connecting to or processing content from one or more remote networks, wherein the one or more exploitable weak points include at least the exploitable trust relationship that the destination host accepts from the remotely exploitable source host.

28. The method recited in claim 25, further comprising determining that the destination host accepts an exploitable trust relationship from an internally exploitable source host in response to the source host having one or more of an internally exploitable service or exploitable client software, wherein the one or more exploitable weak points include at least the exploitable trust relationship that the destination host accepts from the internally exploitable source host.

29. The method recited in claim 18, further comprising:
selecting the at least one host associated with the simulated attack based on the host having at least one internally exploitable service, wherein the selected host comprises a destination host associated with at least one internal connection identified in the network;
using the modeled one or more trust relationships to determine one or more network addresses that correspond to one or more source hosts that have connected to a network address associated with the destination host; and
processing the one or more network addresses that correspond to the one or more source hosts that have connected to the destination host to determine the one or more network addresses that could be used to compromise the at least one host.

30. The method recited in claim 29, wherein the one or more network addresses that correspond to the one or more source hosts that have connected to the destination host are processed using a simulation algorithm that comprises:
selecting a current network address among the one or more network addresses that correspond to the one or more source hosts that have connected to the destination host;
determining that the one or more network addresses that could be used to compromise the at least one host include the current network address in response to the source host associated with the current network address connecting to the destination host on an exploitable port, wherein an exploitation path to reach the exploitable vulnerability on the at least one host includes an exploit used to connect the source host to the destination host on the exploitable port;
using the modeled one or more trust relationships to determine one or more second order network addresses that correspond to one or more source hosts that have connected to the current network address in response to the source host associated with the current network address having an internally exploitable service, wherein the one or more second order network addresses exclude any network addresses that are included among the one or more network addresses that could be used to compromise the at least one host and one or more hosts in the network that have one or more internally exploitable services; and
executing the simulation algorithm to iteratively process the one or more second order network addresses that correspond to the one or more source hosts that have connected to the current network address until no further second order network addresses are determined.

31. The method recited in claim 30, wherein the simulation algorithm further comprises iteratively processing the one or more network addresses that correspond to the one or more source hosts that have connected to the destination host until all source hosts that have connected to the destination host have been processed.

32. The method recited in claim 18, further comprising generating a report that describes an exploitation path that the one or more network addresses could use to compromise the at least one host based on the simulated attack according to one or more severity levels.

33. The method recited in claim 18, wherein the one or more exploitable weak points include one or more of a network vulnerability having a publicly known exploit associated therewith or a network vulnerability satisfying one or more predetermined criteria associated with a vulnerability scoring system.

34. The method recited in claim 18, further comprising:
configuring a log aggregator to collect one or more events that describe activity in the network; and
using information associated with the one or more events collected at the log aggregator to model the one or more trust relationships and identify the one or more exploitable weak points in the network.

35. A computer-readable storage device having computer-executable instructions stored thereon for predicting attack paths in a network, wherein the computer-executable instructions are configured to cause one or more processors to:
configure one or more scanners to determine one or more network addresses and one or more open ports associated with one or more connections in the network;
identify, in the network, at least one host that has an exploitable vulnerability based on the one or more network addresses and the one or more open ports associated with the one or more network connections;

model one or more trust relationships accepted at the at least one host based on the one or more network addresses and the one or more open ports associated with the one or more network connections, wherein the one or more trust relationships accepted at the at least one host provide an available access control path to the exploitable vulnerability on the at least one host;

simulate an attack against the at least one host, the simulated attack used to determine one or more network addresses that could use the one or more trust relationships accepted at the at least one host to reach the exploitable vulnerability on the at least one host; and determine that the one or more network addresses could be used to compromise the at least one host based at least in part on the one or more network addresses corresponding to one or more remote clients that have one or more exploitable weak points.

* * * * *